United States Patent
Islam et al.

(10) Patent No.: US 10,708,111 B2
(45) Date of Patent: *****Jul. 7, 2020

(54) COMMUNICATION OF UPLINK CONTROL INFORMATION

(71) Applicant: QUALCOMM Incorporated, San Diego, CA (US)

(72) Inventors: Muhammad Nazmul Islam, Edison, NJ (US); Sundar Subramanian, San Diego, CA (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/301,423

(22) PCT Filed: Feb. 14, 2017

(86) PCT No.: PCT/US2017/017838
§ 371 (c)(1),
(2) Date: Nov. 13, 2018

(87) PCT Pub. No.: WO2017/142880
PCT Pub. Date: Aug. 24, 2017

(65) Prior Publication Data
US 2019/0199570 A1      Jun. 27, 2019

Related U.S. Application Data

(63) Continuation-in-part of application No. 15/224,122, filed on Jul. 29, 2016, now Pat. No. 10,278,145.
(Continued)

(51) Int. Cl.
*H04W 56/00* (2009.01)
*H04W 72/04* (2009.01)
(Continued)

(52) U.S. Cl.
CPC ....... *H04L 27/2666* (2013.01); *H04B 17/318* (2015.01); *H04L 5/0053* (2013.01);
(Continued)

(58) Field of Classification Search
CPC ............ H04L 25/0224; H04L 27/2655; H04L 27/2613; H04L 27/2675; H04J 11/0069;
(Continued)

(56) References Cited

U.S. PATENT DOCUMENTS 9,001,780 B2      4/2015 Chen et al.
10,278,145 B2 *   4/2019 Islam ................ H04W 56/0005
(Continued)

FOREIGN PATENT DOCUMENTS

WO      2015167286 A1    11/2015
WO      2016015350 A1     2/2016
(Continued)

OTHER PUBLICATIONS

International Search Report and Written Opinion—PCT/US2017/017838—ISA/EPO—dated May 24, 2017.

*Primary Examiner* — Mohamed A Kamara
(74) *Attorney, Agent, or Firm* — Loza & Loza, LLP

(57) ABSTRACT

Various aspects of the disclosure relate to communicating random access information and uplink control information. In some aspects, a user equipment (UE) or other suitable apparatus transmits physical uplink control channel (PUCCH) information concurrently with random access channel (RACH) information transmitted by another UE or other apparatus. For example, the RACH access information and the PUCCH information may be frequency division multiplexed orthogonal tones. The disclosure relates in some aspects to using downlink-uplink (DL-UL) channel reciprocity to determine symbol and/or tone locations. For example, a base station or other suitable apparatus may
(Continued)

initially sweep across different directions in different time slots to transmit signals during a synchronization sub-frame. A UE or other suitable apparatus can then find an appropriate RACH symbol from its best synchronization beam index and transmit PUCCH information in those symbols.

50 Claims, 25 Drawing Sheets

Related U.S. Application Data

(60) Provisional application No. 62/297,861, filed on Feb. 20, 2016, provisional application No. 62/438,196, filed on Dec. 22, 2016.

(51) Int. Cl.
*H04L 27/26* (2006.01)
*H04B 17/318* (2015.01)
*H04W 74/08* (2009.01)
*H04L 5/00* (2006.01)

(52) U.S. Cl.
CPC ........ *H04L 27/261* (2013.01); *H04L 27/2602* (2013.01); *H04W 56/001* (2013.01); *H04W 56/0045* (2013.01); *H04W 72/0413* (2013.01); *H04W 74/0833* (2013.01); *H04L 5/0048* (2013.01)

(58) Field of Classification Search
CPC ......... H04J 11/0073; H04J 2011/0096; H04W 56/0005; H04W 72/0446; H04W 74/00; H04W 74/0833; H04W 56/00; H04W 56/001; H04W 72/1284
See application file for complete search history.

(56) References Cited

U.S. PATENT DOCUMENTS

| | | | |
|---|---|---|---|
| 2008/0089312 A1* | 4/2008 | Malladi | H04L 5/005 370/345 |
| 2009/0111445 A1 | 4/2009 | Ratasuk et al. | |
| 2010/0142475 A1* | 6/2010 | Kim | H04L 5/0053 370/329 |
| 2014/0119313 A1* | 5/2014 | Yang | H04W 74/0833 370/329 |
| 2014/0233445 A1 | 8/2014 | Yang et al. | |
| 2015/0036566 A1 | 2/2015 | Blankenship et al. | |
| 2015/0208404 A1 | 7/2015 | Yie et al. | |
| 2015/0282155 A1 | 10/2015 | Webb et al. | |
| 2016/0164642 A1* | 6/2016 | Lee | H04W 72/0406 370/280 |
| 2016/0165631 A1* | 6/2016 | Gao | H04L 5/001 370/336 |
| 2017/0245230 A1 | 8/2017 | Islam et al. | |

FOREIGN PATENT DOCUMENTS

| | | |
|---|---|---|
| WO | 2016021963 A1 | 2/2016 |
| WO | 2016210302 A1 | 12/2016 |

\* cited by examiner

COMMUNICATION OF UPLINK CONTROL INFORMATION

CROSS-REFERENCE TO RELATED APPLICATION(S)

This application claims priority to and the benefit of PCT patent application number PCT/US17/17838, which claims priority to and the benefit of provisional patent application No. 62/438,196 filed in the U.S. Patent and Trademark Office on Dec. 22, 2016, the PCT application is a continuation-in-part of patent application Ser. No. 15/224,122 filed in the U.S. Patent and Trademark Office on Jul. 29, 2016 and to be issued as U.S. Pat. No. 10,278,145, which claims priority to and the benefit of provisional patent application No. 62/297,861 filed in the U.S. Patent and Trademark Office on Feb. 20, 2016, the entire contents of each of which are incorporated herein by reference.

INTRODUCTION

Various aspects described herein relate to wireless communication and, more particularly but not exclusively, to communicating uplink control information.

In some multiple access wireless communication systems, several devices communicate with a base station (BS). In some scenarios, the base station is equipped with multiple transmit antennas and multiple receive antennas. One example is a millimeter wave (mmW) system where multiple antennas are used for beamforming (e.g., in the range of 30 GHz, 60 GHz, etc.). Such a base station may communicate with the devices in a time-division-multiplexing (TDM) or time-division-duplexing (TDD) manner. That is, the base station transmits to a first device in a first time interval and then to a second device subsequently in a second time interval. Often, the beamforming directions to these two devices are distinct. As a result, the base station may change its beamforming setting from the first time interval to the second time interval.

FIG. 1 illustrates a communication system 100 where a mmW base station 102 communicates with a first mmW user equipment (UE) 104 and a second mmW UE 106 via different beamforming directions. As indicated by a set of beams 108, the mmW base station 102 may communicate via any one of a plural of directional beams. As indicated by a set of beams 110, the first mmW UE 104 may communicate via any one of a plural of directional beams. As indicated by a set of beams 112, the second mmW UE 106 may communicate via any one of a plural of directional beams. Thus, at a given point in time, the base station 102 may communicate with the first mmW UE 104 via a first beamforming direction 114 and communicate with the second mmW UE 106 via a second beamforming direction 116.

In millimeter wave systems, a directional random access channel (DRACH) may be used for initial network access. A base station may sweep across different directions in different time slots and wait to receive DRACH signals from UEs. DRACH signals may occupy a narrower bandwidth and have a longer duration than other signals. For example, the DRACH signals may occupy an inner portion of the total available bandwidth. Consequently, the system link budget may be unnecessarily high.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: communicate synchronization signals; determine a specific time for communication of uplink control information, wherein the determination of the specific time is based on the synchronization signals; and communicate the uplink control information at the specific time.

Another aspect of the disclosure provides a method for communication including: communicating synchronization signals; determining a specific time for communication of uplink control information, wherein the determination of the specific time is based on the synchronization signals; and communicating the uplink control information at the specific time.

Another aspect of the disclosure provides an apparatus configured for communication. The apparatus including: means for communicating synchronization signals; means for determining a specific time for communication of uplink control information, wherein the determination of the specific time is based on the synchronization signals; and means for communicating the uplink control information at the specific time.

Another aspect of the disclosure provides a non-transitory computer-readable medium storing computer-executable code, including code to: communicate synchronization signals; determine a specific time for communication of uplink control information, wherein the determination of the specific time is based on the synchronization signals; and communicate the uplink control information at the specific time.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
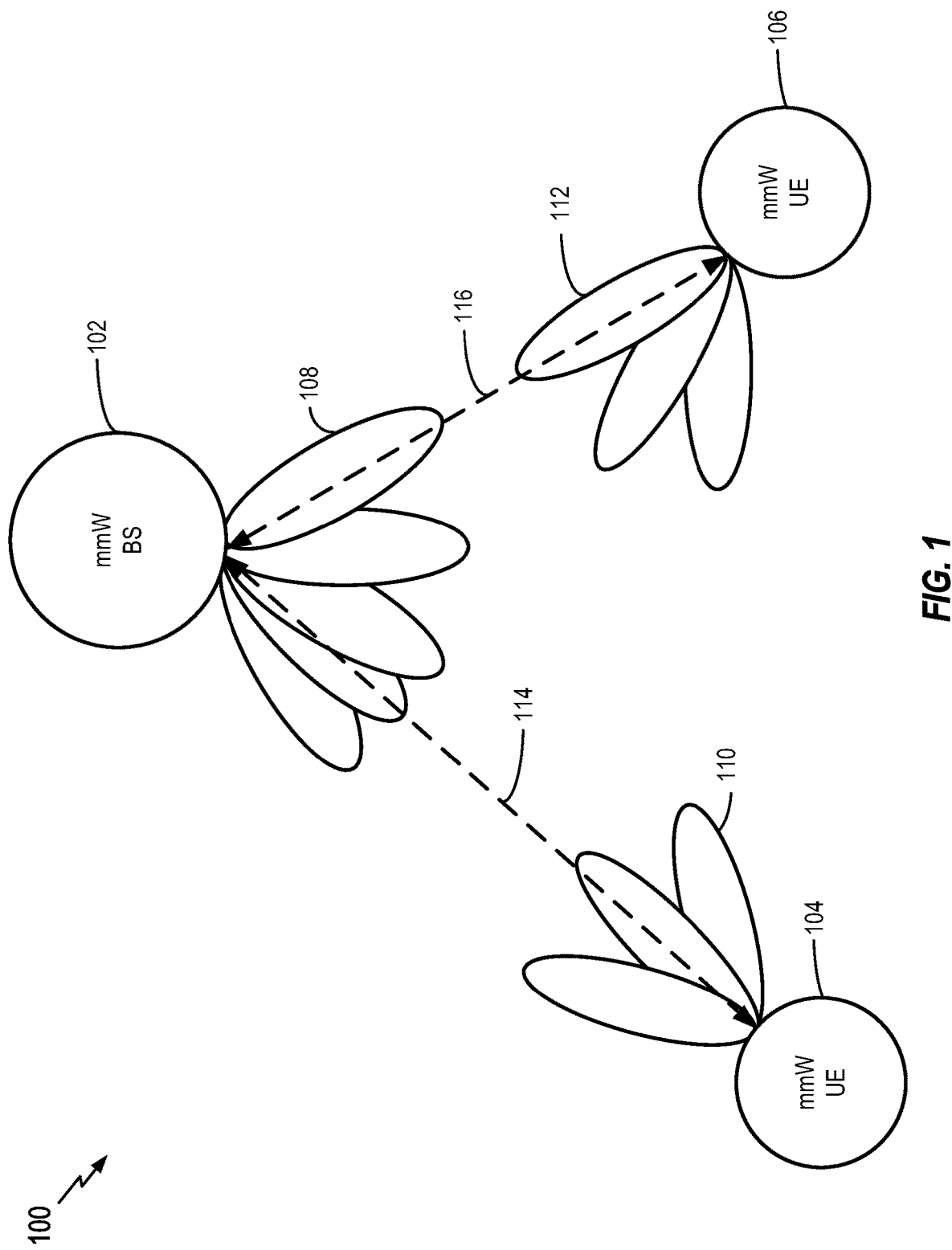
FIG. 1 is a diagram of an example communication system employing beamforming.

In some aspects, the disclosure relates to determining timing (e.g., symbol locations) and/or tone locations based on signals transmitted during a synchronization sub-frame. A base station may initially sweep across different directions in different time slots to transmit the signals. For brevity, the signals transmitted during a synchronization sub-frame may be referred to herein as synchronization sub-frame signals. Using downlink-uplink (DL-UL) channel reciprocity, UEs can find the appropriate random access channel (RACH) symbol from their best synchronization sub-frame signal beam index and transmit PUCCH information in those symbols. In some implementations, a given UE can determine the tone location of its PUCCH transmission during DRACH symbols from the UE's ID. In some implementations, a given UE can determine the tone location of its PUCCH transmission during DRACH symbols from explicit scheduling information received from the base station.

In some aspects, the disclosure relates to using bandwidth (e.g., outer bandwidth) that is otherwise unused during DRACH transmission for the transmission of physical uplink control channel (PUCCH) information. PUCCH may include, for example, channel quality information (CQI), a scheduling request (SR), a precoding matrix indicator (PMI), or other information. The disclosure relates to transmission of physical uplink control channel (PUCCH) information concurrently with random access channel (RACH) information. For example, different UEs may transmit the RACH access information and the PUCCH information as frequency division multiplexed orthogonal tones.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure. The teachings herein can be implemented according to various network technologies including, without limitation, fifth generation (5G) technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system. For purposes of illustration, the following may describe various aspects in the context of an LTE system. It should be appreciated, however, that the teachings herein may be employed in other systems as well.

Synchronization Signaling

Figure 2:
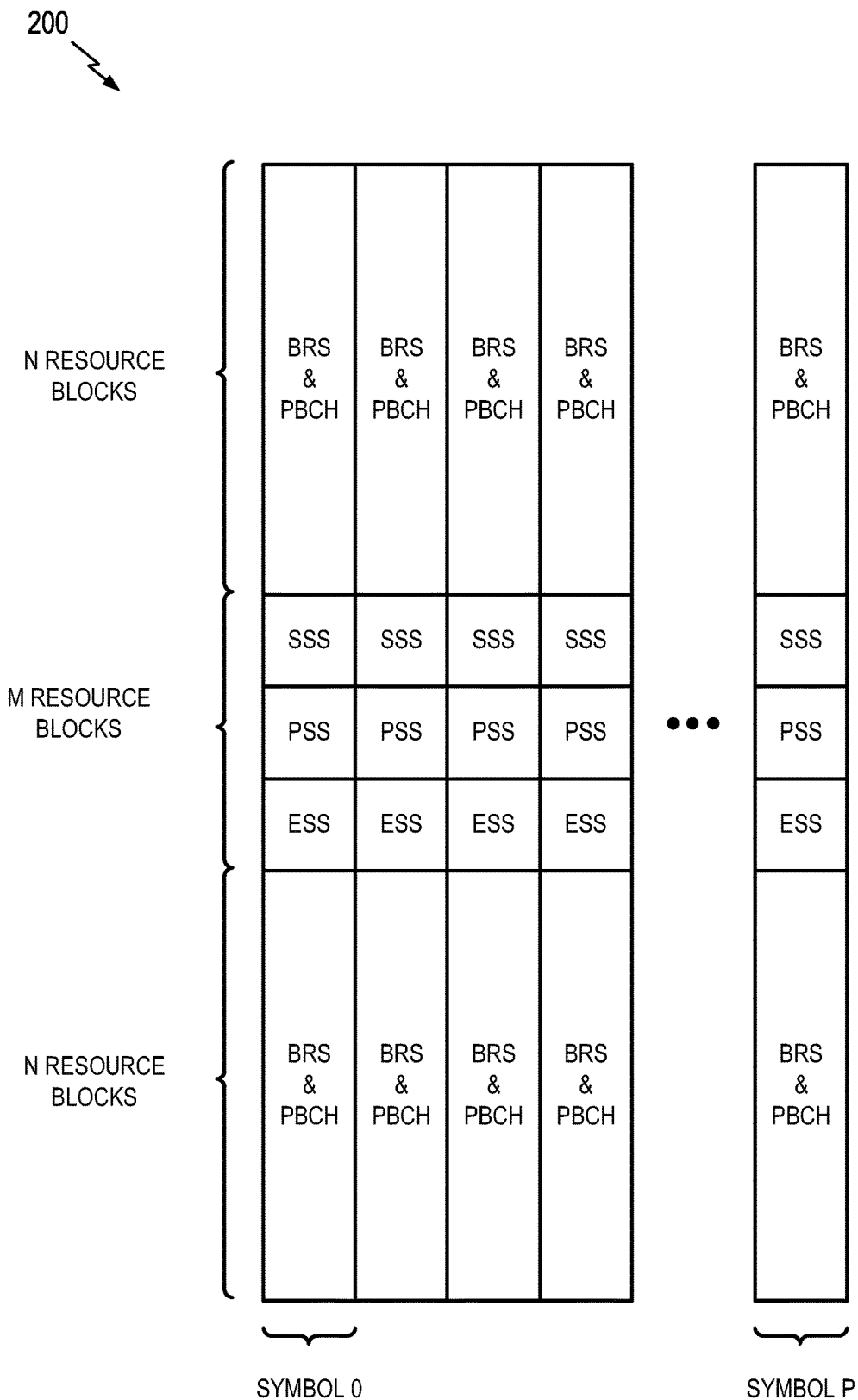
FIG. 2 is a diagram of an example synchronization sub-frame in accordance with some aspects of the disclosure.

In millimeter wave systems, a base station may transmit synchronization signals directionally to meet a high link budget. In accordance with the teachings herein, a base station may transmit several signals in the synchronization sub-frame so that the UEs can synchronize to the system. FIG. 2 shows an example of different signals transmitted during a synchronization sub-frame 200. In some cases, a base station may transmit these signals simultaneously from multiple antenna ports. Primary synchronization signal (PSS) and secondary synchronization signals (SSS) may be transmitted so that the UEs can obtain timing and cell information. An extended synchronization signal (ESS) may convey the symbol index and thereby enable the UEs to find the symbol level boundary. A physical broadcast channel (PBCH) may convey a master information block to the UEs. A beam reference signal (BRS) may enable the UEs to find the best antenna port within a particular symbol.

In accordance with the teachings herein, UEs can use one or more combinations of PSS, SSS, PBCH, BRS and ESS to find the resource for RACH transmission. In some aspects, the UEs can measure the strength of these signals, transmitted during the synchronization sub-frame 200, to find the timing for RACH transmission. The UEs can use different metrics such as reference signal received power (RSRP), reference signal received quality (RSRP), signal to noise ratio (SNR), signal to interference plus noise ratio (SINR), received signal strength indicator (RSSI), etc., to measure signal strength.

Figure 3:
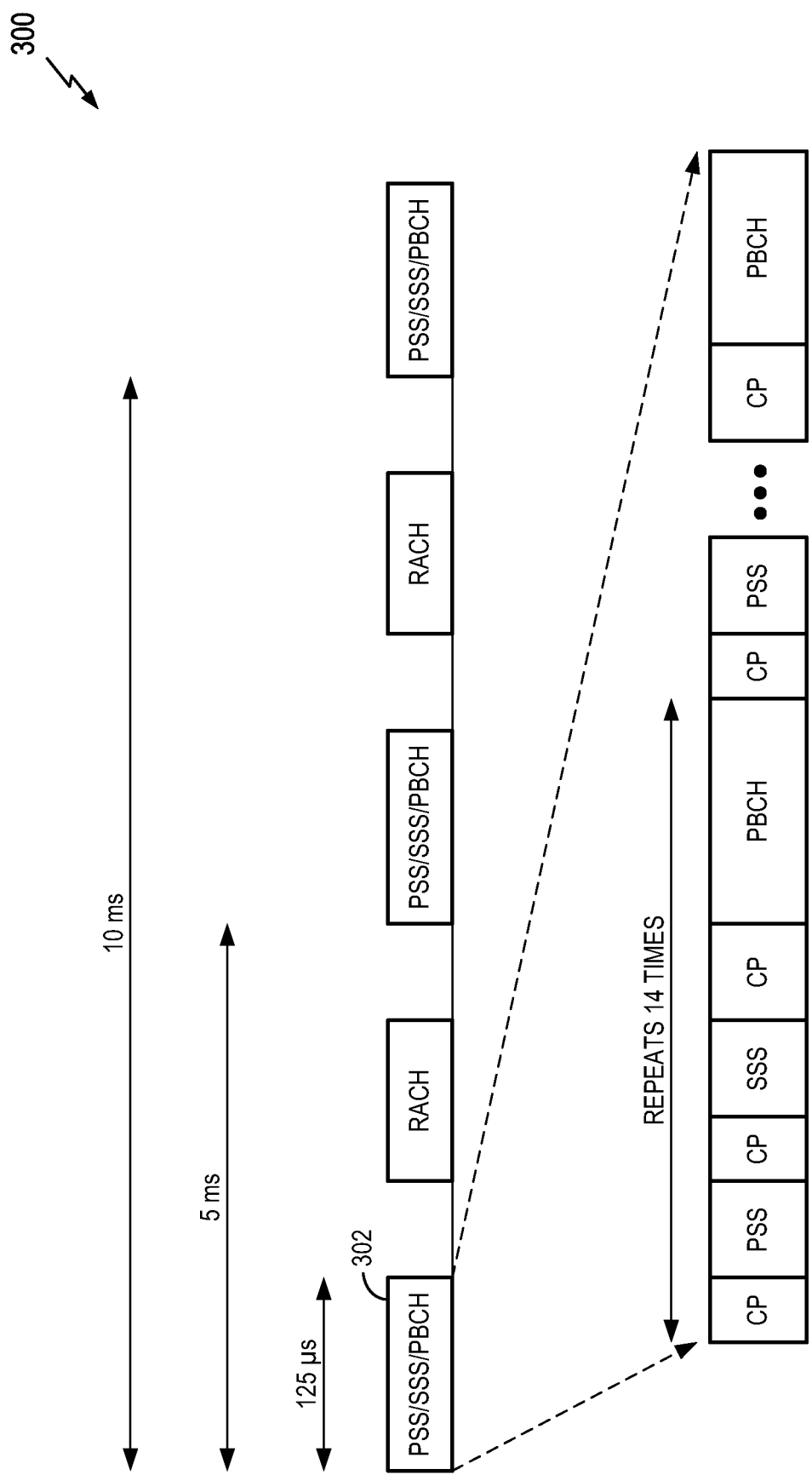
FIG. 3 is a diagram of an example time division multiplexed synchronization sub-frame in accordance with some aspects of the disclosure.

FIG. 3 is a timing diagram 300 illustrating an example of a time division multiplexed synchronization sub-frame 302 that includes PSS, SSS, and PBCH signals. Each of the PSS, SSS, and PBCH signals in the sub-frame 302 is preceded by a cyclic prefix (CP). In the example of FIG. 3, the sequence of PSS, SSS, and PBCH signals is repeated fourteen times in each sub-frame 302.

In an example implementation, Zadoff-Chu (ZC) sequences may be used for synchronization (e.g., a PSS, SSS, etc.) and access (e.g., a RACH). The RACH waveform may span several (e.g., greater than 8) symbols to overcome the relatively smaller equivalent isotropically radiated power (EIRP) of the UE (e.g., the UE 104 of FIG. 1). To enable the UE to learn useful transmit/receive (Tx/Rx) beam pairs and to overcome high pathloss, beamforming may be used on Rx and Tx. These beamformed PSS, SSS, ESS, BRS, PBCH, and RACH signals may be referred to as directed PSS (DPSS), directed SSS (DSSS), directed ESS (DESS), directed BRS (DBRS), directed PBCH (DPBCH), and directed RACH (DRACH), respectively.

Figure 4:
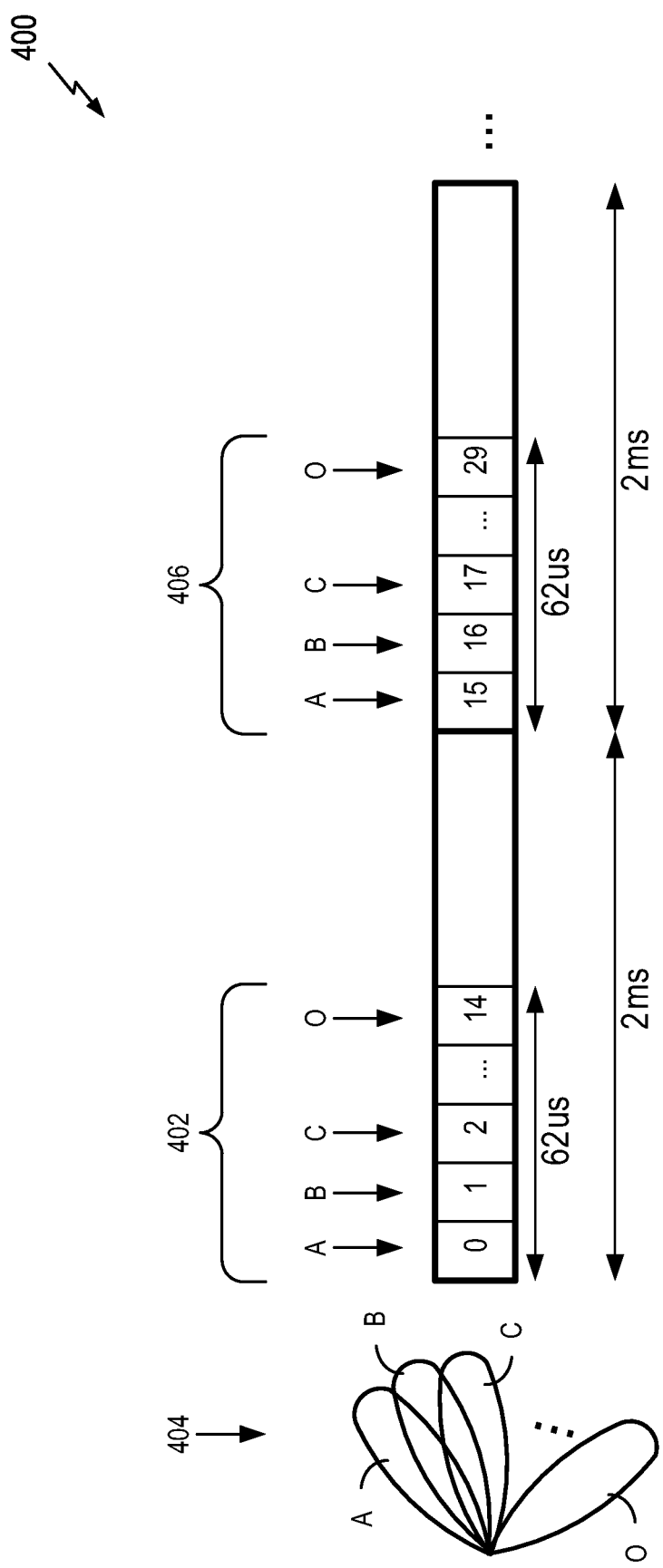
FIG. 4 is a diagram of an example of a signal transmitted during a synchronization sub-frame in accordance with some aspects of the disclosure.

FIG. 4 illustrates an example of a waveform 400 for a synchronization sub-frame signal. A mmW base station (MWB) such the base station 102 of FIG. 1 sends out at least one of PSS, SSS, BRS, PBCH, ESS, or any combination thereof on several successive symbols 402. As represented by the beams 404, the symbols are sent in different directions A, B, C, . . . O sweeping through the entire sector. In the example of FIG. 4, the sweep in the synchronization sub-frame consumes 15 successive symbols and is repeated (e.g., via the symbols 406) every 2 milliseconds.

Synchronization and Access Signaling

Figure 5:
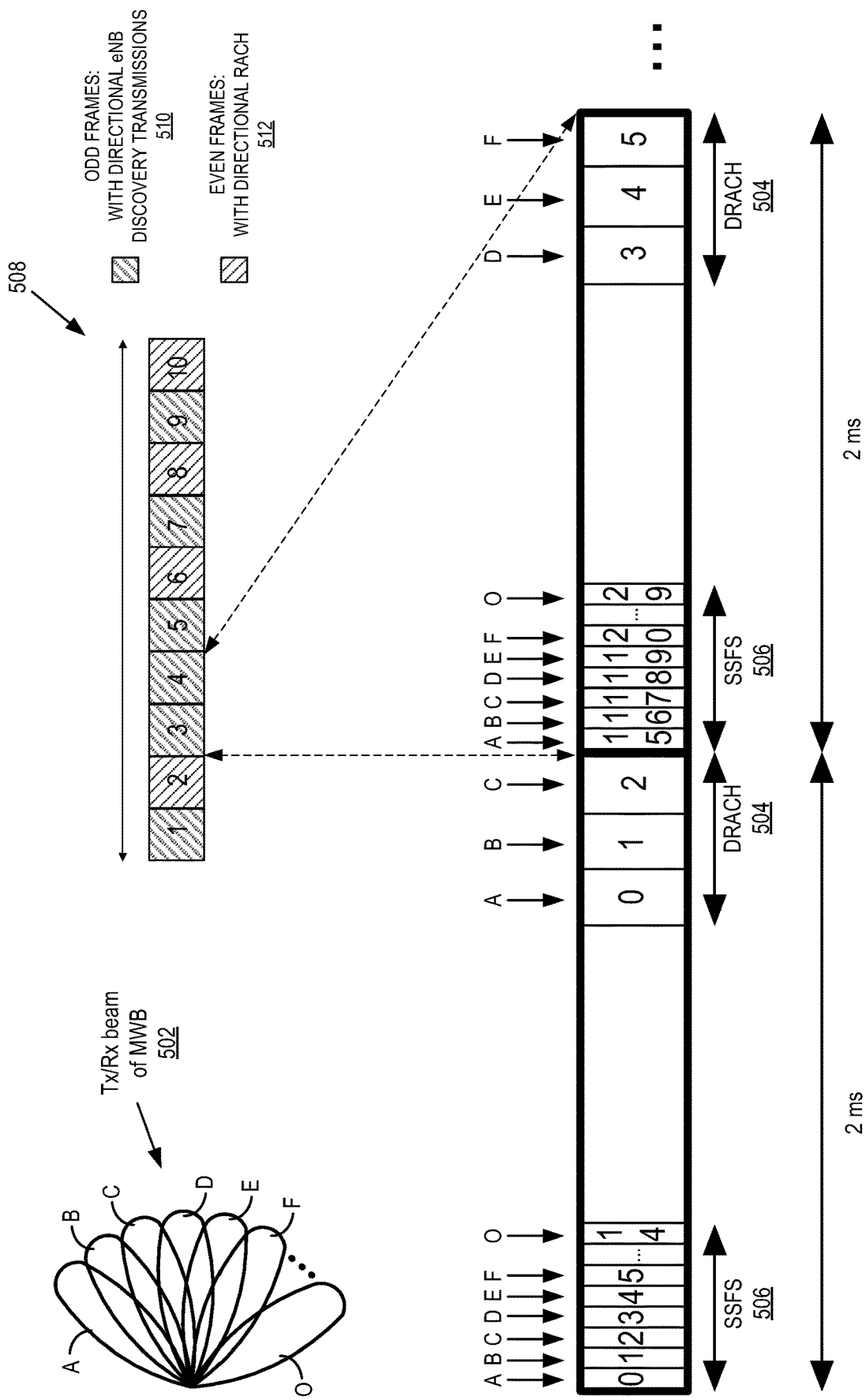
FIG. 5 is a diagram of an example of a signal transmitted during a synchronization sub-frame and a DRACH signal in accordance with some aspects of the disclosure.

FIG. 5 illustrates an example 500 of synchronization between MWB beams 502 for synchronization sub-frame signals 506 (SSFS) and a DRACH 504. The MWB (e.g., the base station 102 of FIG. 1) receives the DRACH 504 using beam patterns which are the same or similar to those used for transmitting the synchronization sub-frame signals 506. The MWB sweeps the entire sector as represented by the MWB beams 502. As indicated by the frame representation 508, some frames 510 may be used for directional eNode B (eNB) discovery transmissions, while other frames 512 may be used for directional RACH.

In some implementations, the duration of a DRACH symbol is eight times the duration of a synchronization symbol. In this case, the bandwidth used for the DRACH signal is ⅛ the bandwidth used for the synchronization sub-frame signals. As a result, there is additional bandwidth available outside the DRACH band. In one scenario, within 10 milliseconds there is a DRACH opportunity for every UE.

As discussed herein, the Tx-beams for the synchronization sub-frame signals and the Rx-beams for DRACH may be synchronized. Using reciprocity, a UE knows from the best beam found during synchronization sub-frame signal reception, at which DRACH symbol it should send the access symbol. Thus, the base station Rx beam pattern (for DRACH)=the base station Tx pattern (for the synchronization sub-frame) as indicated by the letter designations A-O in FIG. 5.

DRACH Location

Figure 6:
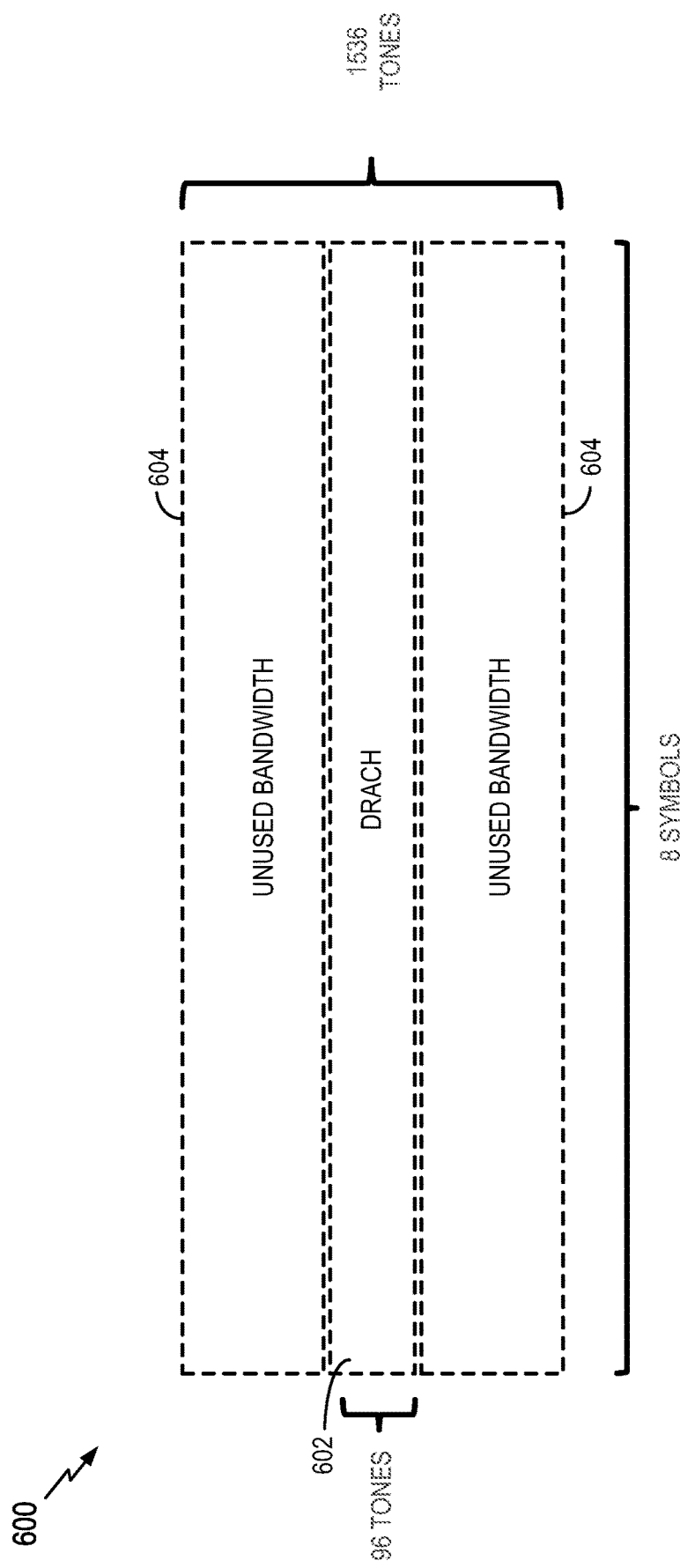
FIG. 6 is a diagram of an example of a DRACH location in accordance with some aspects of the disclosure.

FIG. 6 illustrates an example of a DRACH location within an example bandwidth allocation 600. If the total system bandwidth is 500 MHz, the bandwidth may contain 1536 usable tones (fast Fourier transform (FFT) size=2048). It should be appreciated that other bandwidths may be applicable to other scenarios.

As one example, a synchronization sub-frame may be transmitted at a central frequency of 250 MHz. Note, however, that some UEs might not have 250 MHz bandwidth capability.

DRACH may use ⅛ of the synchronization sub-frame's band as discussed above. Thus, DRACH may use 31.25 MHz (e.g., 96 tones) as indicated by the region 602 in FIG. 6. As indicated by the regions 604 in FIG. 6, the outer bands remain unused during DRACH in this example.

RACH and PUCCH Locations

Figure 7:
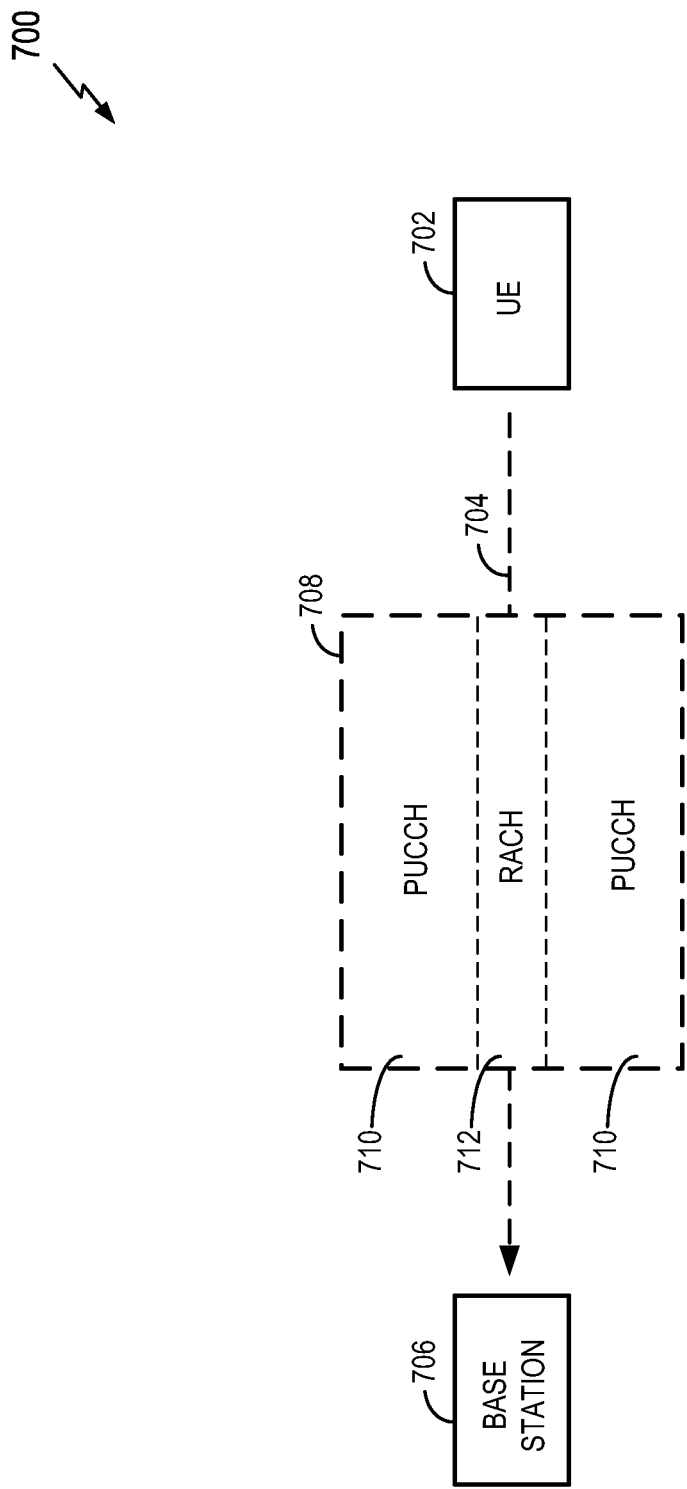
FIG. 7 is a diagram of an example communication system employing random access channel (RACH) and physical uplink control channel (PUCCH) communication in accordance with some aspects of the disclosure.

FIG. 7 illustrates a communication system 700 where a UE 702 sends uplink information 704 to a base station 706. In some implementations, the UE 702 and the base station 706 may include mmW functionality as in the UEs 104 and 106 and the base station 102 of FIG. 1, respectively.

As represented by a time (x axis) and frequency (y axis) resource block 708 in FIG. 7, PUCCH information 710 (e.g., sent by a first UE) may be sent concurrently with RACH information 712 (e.g., sent by a second UE). In this example, the PUCCH information 710 is sent via bandwidth that is outside of the central bandwidth used to send the RACH information 712. It should be appreciated, however, that in other implementations control information such as PUCCH information need not be sent concurrently with RACH information.

Figure 8:
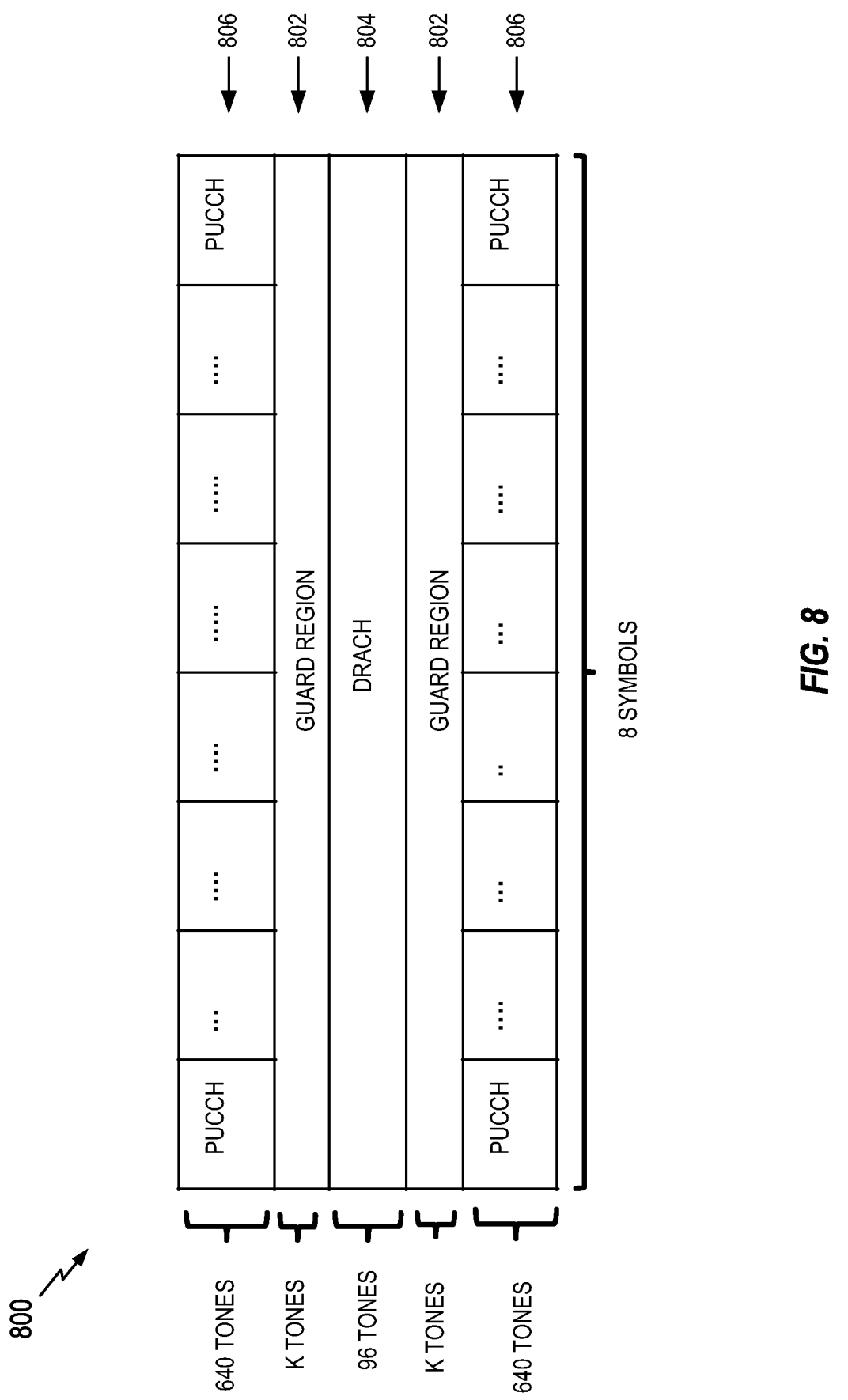
FIG. 8 is a diagram of an example of PUCCH tone locations in accordance with some aspects of the disclosure.

FIG. 8 illustrates an example resource allocation 800 for PUCCH tone locations that may be used during DRACH in accordance with the teachings herein. In this example, K tones 802 are used as guard regions on both sides of the DRACH region 804. The remaining tones (1536-2K-96 tones) are used for the PUCCH regions 806. In some scenarios, the UEs (e.g., the UE 104 of FIG. 1) may send channel quality information (CQI), precoding matrix information, and a scheduling request (SR) in the PUCCH regions 806.

CQI Structure

Figure 9:
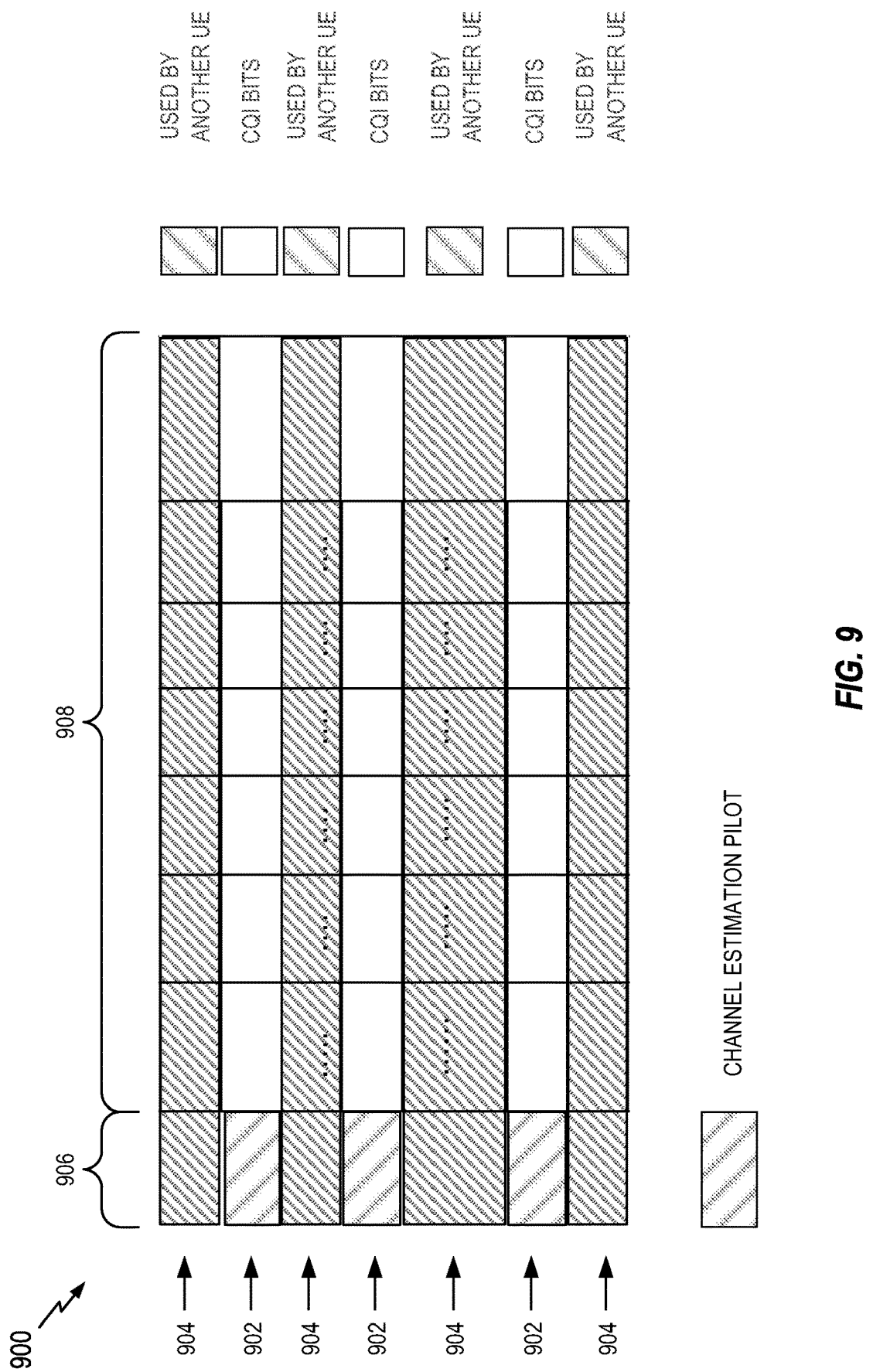
FIG. 9 is a diagram of an example of a channel quality information (CQI) structure in accordance with some aspects of the disclosure.

FIG. 9 illustrates an example of a CQI structure 900 that may be used in a PUCCH-DRACH scheme as taught herein. In this example, 18 tones are used in eight symbols (x axis). Tones are interleaved. One set of tones 902 is used by a UE (e.g., the UE 104 of FIG. 1). Other sets of tones 904 are used by other UEs. The first symbol 906 transmits two sets of the ZC(1,9) sequence (e.g., a channel estimation pilot). The next seven symbols 908 transmit CQI with two sets of Reed Solomon [9, 3, 7] code in GF(16). There may be 8 information bits per symbol codeword and 4 parity bits. Thus, in this example, there may be 112 (8*2*7) bits of CQI feedback during DRACH-PUCCH. Other CQI structures could be used in other implementations.

UEs that face 1-4 dB DL signal-to-noise ratio (SNR) might transmit only one set of ZC and RS sequences. For example, these UEs could transmit 56 (8*7) CQI bits in total during DRACH-PUCCH. Other UEs (e.g., with good SNR) may use more tones (e.g., 6 sub-bands instead of 3 sub-bands).

In other implementations, a given UE may use fewer than eight symbols in a given frame (e.g., different symbols in the frame could be allocated to different UEs). In this case, a UE may know which symbol to use based on the beam index associated with the synchronization sub-frame. For example, the best beam found during the synchronization search could be identified and a corresponding beam used for the DRACH-PUCCH. The channel quality of PSS, SSS, ESS, BRS and PBCH could be used to find the best beam of the synchronization sub-frame for that particular UE. Moreover, there may be a 1:1 mapping (or some other relationship) between beams and symbols. For example, beam A may be mapped to symbol 1, beam B mapped to symbol 2, and so on. Thus, the identification of a particular beam may indicate a particular symbol to use.

The particular symbols to be used for the DRACH-PUCCH could be identified by other means as discussed herein. For example, a base station may explicitly tell a UE which symbols to use. As another example, a UE may use its identifier (ID) to determine which symbols to use (e.g., based on a known mapping between UE IDs and symbol locations).

Cyclic Shift

In some scenarios, multiple UEs could transmit in the same set of subcarriers and the same set of symbol locations. To reduce interference between the signals of these UEs, cyclic shifting could be employed for the sequences (e.g., ZC sequences) used by the UEs in those sets of subcarriers. Thus, a given UE (e.g., the UE 104 of FIG. 1) may use a particular cyclic shift when transmitting signals for the DRACH-PUCCH. To this end, a base station (e.g., the base station 102 of FIG. 1) may send an indication of the particular cyclic shift that a UE is to use.

Other Aspects

In view of the above, in some aspects, UEs may transmit physical uplink control channel information (PUCCH) to the base station during periods that are reserved for DRACH. In some aspects, the PUCCH may constitute channel quality information, precoding matrix information, a scheduling request, and ACK/NAK information. In some aspects, PUCCH and DRACH may be transmitted in frequency division multiplexed (FDMed) orthogonal tones. In some aspects, the UEs may receive a synchronization sub-frame from the base station and determine the symbol locations and/or tone locations where the UEs should transmit PUCCH. In some aspects, the base station may explicitly inform UEs the symbol and/or tone locations where the UEs should transmit PUCCH. In some aspects, the UEs may use their ID to determine the symbol locations and/or tone locations where the UEs should transmit PUCCH (e.g., based on a known mapping between UE IDs and symbol locations and/or tone locations). In some aspects, a UE may determine symbol locations based on synchronization signals that are transmitted by a base station towards different beam directions, but the UE receives tone and cyclic shift information (e.g., indications of the tone locations and the cyclic shift that the UE is to use) from the base station.

First Example Apparatus

Figure 10:
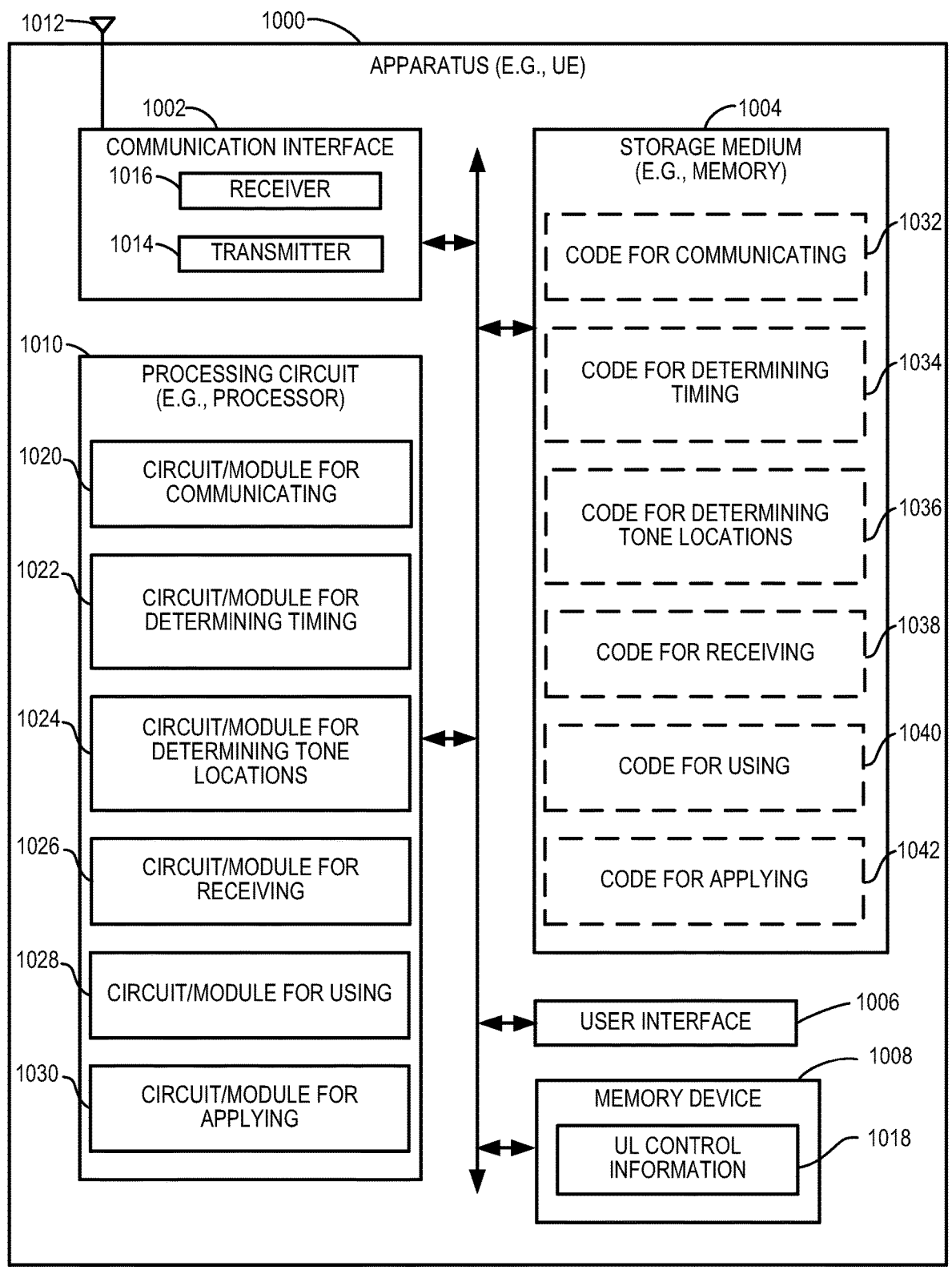
FIG. 10 is a block diagram illustrating an example hardware implementation for an apparatus (e.g., an electronic device) that can support communication in accordance with some aspects of the disclosure.

FIG. 10 illustrates a block diagram of an example hardware implementation of an apparatus 1000 configured to communicate according to one or more aspects of the disclosure. The apparatus 1000 could embody or be implemented within a UE, a base station, or some other type of device that supports wireless communication. In various implementations, the apparatus 1000 could embody or be implemented within an access terminal, an access point, or some other type of device. In various implementations, the apparatus 1000 could embody or be implemented within a mobile phone, a smart phone, a tablet, a portable computer, a server, a personal computer, a sensor, an entertainment device, a medical device, or any other electronic device having circuitry.

The apparatus 1000 includes a communication interface 1002 (e.g., at least one transceiver), a storage medium 1004 (e.g., a memory device), a user interface 1006, a memory device 1008 (e.g., a memory circuit), and a processing circuit 1010 (e.g., at least one processor). In various implementations, the user interface 1006 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 provides a means for communicating with other apparatuses over a transmission medium. In some implementations, the communication interface 1002 includes circuitry and/or programming adapted to facilitate the communication of information bi-directionally with respect to one or more communication devices in a network. In some implementations, the communication interface 1002 is adapted to facilitate wireless communication of the apparatus 1000. In these implementations, the communication interface 1002 may be coupled to one or more antennas 1012 as shown in FIG. 10 for wireless communication within a wireless communication system. The communication interface 1002 can be configured with one or more standalone receivers and/or transmitters, as well as one or more transceivers. In the illustrated example, the communication interface 1002 includes a transmitter 1014 and a receiver 1016. The communication interface 1002 serves as one example of a means for receiving and/or means transmitting.

The memory device 1008 may represent one or more memory devices. As indicated, the memory device 1008 may maintain uplink control information 1018 along with other information used by the apparatus 1000. In some implementations, the memory device 1008 and the storage medium 1004 are implemented as a common memory component. The memory device 1008 may also be used for storing data that is manipulated by the processing circuit 1010 or some other component of the apparatus 1000.

The storage medium 1004 may represent one or more computer-readable, machine-readable, and/or processor-readable devices for storing programming, such as processor executable code or instructions (e.g., software, firmware), electronic data, databases, or other digital information. The storage medium 1004 may also be used for storing data that is manipulated by the processing circuit 1010 when executing programming. The storage medium 1004 may be any available media that can be accessed by a general purpose or special purpose processor, including portable or fixed storage devices, optical storage devices, and various other mediums capable of storing, containing or carrying programming.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory (e.g., tangible) storage medium.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the apparatus 1000, external to the apparatus 1000, distributed across multiple entities, etc.).

Programming stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols.

The processing circuit 1010 is generally adapted for processing, including the execution of such programming stored on the storage medium 1004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired programming provided by appropriate media in at least one example. For example, the processing circuit 1010 may be implemented as one or more processors, one or more controllers, and/or other structure configured to execute executable programming Examples of the processing circuit 1010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the apparatuses described herein. For example, the processing circuit 1010 may be configured to perform any of the steps, functions, and/or processes described with respect to FIGS. 11-16. As used herein, the term "adapted" in relation to the processing circuit 1010 may refer to the processing circuit 1010 being one or more of configured, employed, implemented, and/or programmed to perform a particular process, function, operation and/or routine according to various features described herein.

The processing circuit 1010 may be a specialized processor, such as an application specific integrated circuit (ASIC) that serves as a means for (e.g., structure for) carrying out any one of the operations described in conjunction with FIGS. 11-16. The processing circuit 1010 serves as one example of a means for transmitting and/or a means for receiving. In various implementations, the processing circuit 1010 may incorporate the functionality of the UE 104 of FIG. 1.

According to at least one example of the apparatus 1000, the processing circuit 1010 may include one or more of a circuit/module for communicating 1020, a circuit/module for determining timing 1022, a circuit/module for determining tone locations 1024, a circuit/module for receiving 1026, a circuit/module for using 1028, or a circuit/module for applying 1030. In various implementations, the circuit/module for communicating 1020, the circuit/module for determining timing 1022, the circuit/module for determining tone locations 1024, the circuit/module for receiving 1026, the circuit/module for using 1028, or the circuit/module for applying 1030 may correspond, at least in part, to the functionality of the UE 104 of FIG. 1.

As mentioned above, programming stored by the storage medium 1004, when executed by the processing circuit 1010, causes the processing circuit 1010 to perform one or more of the various functions and/or process operations described herein. For example, the programming, when executed by the processing circuit 1010, may cause the processing circuit 1010 to perform the various functions, steps, and/or processes described herein with respect to FIGS. 11-16 in various implementations. As shown in FIG. 10, the storage medium 1004 may include one or more of code for communicating 1032, code for determining timing 1034, code for determining tone locations 1036, code for receiving 1038, code for using 1040, or code for applying 1042. In various implementations, the code for communicating 1032, the code for determining timing 1034, the code for determining tone locations 1036, the code for receiving 1038, the code for using 1040, or the code for applying 1042 may be executed or otherwise used to provide the functionality described herein for the circuit/module for communicating 1020, the circuit/module for determining timing 1022, the circuit/module for determining tone locations 1024, the circuit/module for receiving 1026, the circuit/module for using 1028, or the circuit/module for applying 1030, respectively.

The circuit/module for communicating 1020 may include circuitry and/or programming (e.g., code for communicating 1032 stored on the storage medium 1004) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1020 may communicate (e.g., receive) synchronization signals. In some aspects, the circuit/module for communicating 1020 may communicate (e.g., send) uplink control information (e.g., at particular symbol locations during a frame and/or at particular tone locations during a frame). In some aspects, the circuit/module for communicating 1020 may communicate (e.g., send) random access information (e.g., via a frame). In some aspects, the circuit/module for communicating 1020 may communicate (e.g., receive) an indication of tone locations. In some aspects, the circuit/module for communicating 1020 may communicate (e.g., receive) an indication of timing (e.g., a specific time, symbol locations, etc.). In some aspects, the circuit/module for communicating 1020 may communicate (e.g., receive) an indication of a cyclic shift. In some aspects, the circuit/module for communicating 1020 may communicate (e.g., receive) an identifier of user equipment.

In some implementation, the circuit/module for communicating 1020 may use one or more parameters for the communicating. For example, the circuit/module for communicating 1020 may obtain information about timing (e.g., a specific time, symbol locations, etc.) and/or tone locations and communicate (e.g., send) information at those locations. As another example, the circuit/module for communicating 1020 may obtain information about a cyclic shift and then use that cyclic shift when communicating (e.g., sending) information.

In some implementations where the communicating involves receiving information, the circuit/module for communicating 1020 receives information (e.g., from the communication interface 1002, the receiver 1016, the memory device 1008, some other component of the apparatus 1000, or some other device), processes (e.g., decodes) the information, and outputs the information to another component of the apparatus 1000 (e.g., the memory device 1008 or some other component). In some scenarios (e.g., if the circuit/module for communicating 1020 includes a receiver), the communicating involves the circuit/module for communicating 1020 receiving information directly from a device that transmitted the information (e.g., via radio frequency signaling or some other type of signaling suitable for the applicable communication medium).

In some implementations where the communicating involves sending information, the circuit/module for communicating 1020 obtains information (e.g., from the memory device 1008 or some other component of the apparatus 1000), processes (e.g., encodes) the information, and outputs the processed information. In some scenarios, the communicating involves sending the information to another component of the apparatus 1000 (e.g., the transmitter 1014, the communication interface 1002, or some other component) that will transmit the information to another device. In some scenarios (e.g., if the circuit/module for communicating 1020 includes a transmitter), the communicating involves the circuit/module for communicating 1020 transmitting the information directly to another device (e.g., the ultimate destination) via radio frequency signaling or some other type of signaling suitable for the applicable communication medium.

In some implementations, the circuit/module for communicating 1020 is a transceiver. In some implementations, the circuit/module for communicating 1020 is a receiver. In some implementations, the circuit/module for communicating 1020 is a transmitter. In some implementations, the communication interface 1002 includes the circuit/module for communicating 1020 and/or the code for communicating 1032. In some implementations, the circuit/module for communicating 1020 and/or the code for communicating 1032 is configured to control the communication interface 1002 (e.g., a transceiver, a receiver, or a transmitter) to communicate the information.

The circuit/module for determining timing 1022 may include circuitry and/or programming (e.g., code for determining timing 1034 stored on the storage medium 1004) adapted to perform several functions relating to, for example, determining timing (e.g., a specific time) for communication of uplink control information. In some aspects, the determined timing may be used to send uplink control information. In some aspects, the determined timing may denote at least one of: a symbol index, a sub-frame index, a radio frame index, or any combination thereof. In some aspects, the determined timing may include symbol locations.

In some implementations, the circuit/module for determining timing 1022 performs the operations that follow if the determination of the timing is based on synchronization signals. In this case, the circuit/module for determining timing 1022 obtains information about the synchronization signals (e.g., from the circuit/module for communicating 1020, the memory device 1008, the communication interface 1002, the receiver 1016, or some other component). For example, the circuit/module for determining timing 1022 may obtain information as discussed herein in conjunction with FIG. 4 and/or FIG. 5. The circuit/module for determining timing 1022 may then identify the timing (e.g., a specific time, symbol locations, etc.) to be used for communication based on the obtained information (e.g., as discussed herein in conjunction with FIG. 4 and/or FIG. 5). For example, the circuit/module for determining timing 1022 may identify the best beam or best beams and then identify (e.g., based on a mapping) the timing (e.g., a symbol location or symbol locations) associated with each identified beam. The circuit/module for determining timing 1022 outputs an indication of the determined timing (e.g., to the circuit/module for communicating 1020, the memory device 1008, the communication interface 1002, the transmitter 1014, or some other component).

In some implementations, the circuit/module for determining timing 1022 performs the operations that follow if the determination of the timing (e.g., a specific time, symbol locations, etc.) is based on an identifier of a user equipment. In this case, the circuit/module for determining timing 1022 obtains the identifier (e.g., from the circuit/module for communicating 1020, the memory device 1008, the communication interface 1002, the receiver 1016, or some other component). The circuit/module for determining timing 1022 then uses an identifier-to-timing mapping (e.g., in the form of a table, an algorithm, or some other suitable mapping) to identify the timing (e.g., a specific time, symbol location or locations, etc.) associated with that identifier. The circuit/module for determining timing 1022 then outputs an indication of the determined timing (e.g., to the circuit/module for communicating 1020, the memory device 1008, the communication interface 1002, the transmitter 1014, or some other component).

The circuit/module for determining tone locations 1024 may include circuitry and/or programming (e.g., code for determining tone locations 1036 stored on the storage medium 1004) adapted to perform several functions relating to, for example, determining tone locations for communication of uplink control information within a frame. In some aspects, the determined tone locations may be used to send uplink control information.

In some implementations, the circuit/module for determining tone locations 1024 performs the operations that follow if the determination of the tone locations is based on synchronization signals. In this case, the circuit/module for determining tone locations 1024 obtains information about the synchronization signals (e.g., from the circuit/module for communicating 1020, the memory device 1008, the communication interface 1002, the receiver 1016, or some other component). For example, the circuit/module for determining tone locations 1024 may obtain information as discussed herein in conjunction with FIG. 4 and/or FIG. 5. The circuit/module for determining tone locations 1024 may then identify the tone locations to be used for communication based on the obtained information (e.g., in a similar manner as discussed herein in conjunction with FIG. 4 and/or FIG. 5). For example, the circuit/module for determining tone locations 1024 may identify the best beam or beams and then identify (e.g., based on a mapping) the tone location associated with those beams. The circuit/module for determining tone locations 1024 outputs an indication of the determined tone locations (e.g., to the circuit/module for communicating 1020, the memory device 1008, the communication interface 1002, the transmitter 1014, or some other component).

In some implementations, the circuit/module for determining tone locations 1024 performs the operations that follow if the determination of the tone locations is based on an identifier of a user equipment. In this case, the circuit/module for determining tone locations 1024 obtains the identifier (e.g., from the circuit/module for communicating 1020, the memory device 1008, the communication interface 1002, the receiver 1016, or some other component). The circuit/module for determining tone locations 1024 then uses an identifier-to-tone location mapping (e.g., in the form of a table, an algorithm, or some other suitable mapping) to identify the tone location or locations associated with that identifier. The circuit/module for determining tone locations 1024 then outputs an indication of the determined tone locations (e.g., to the circuit/module for communicating 1020, the memory device 1008, the communication interface 1002, the transmitter 1014, or some other component).

The circuit/module for receiving 1026 may include circuitry and/or programming (e.g., code for receiving 1038 stored on the storage medium 1004) adapted to perform several functions relating to, for example, receiving information. In some implementations, the circuit/module for receiving 1026 performs the operations that follow. The circuit/module for receiving 1026 obtains information (e.g., from the communication interface 1002, the receiver 1016, the memory device 1008, some other component of the apparatus 1000, or some other device), processes (e.g., decodes) the information, and outputs the information to another component of the apparatus 1000 (e.g., the memory device 1008 or some other component). In some scenarios (e.g., if the circuit/module for receiving 1026 includes a receiver), the circuit/module for receiving 1026 receives information directly from a device that transmitted the information (e.g., via radio frequency signaling or some other type of signaling suitable for the applicable communication medium).

The received information may take different forms in different scenarios. In some aspects, the circuit/module for receiving 1026 may receive an indication of tone locations. In some aspects, the circuit/module for receiving 1026 may receive an indication of timing (e.g., a specific time, symbol locations, etc.). In some aspects, the circuit/module for receiving 1026 may receive an indication of a cyclic shift. In some aspects, the circuit/module for receiving 1026 may receive an identifier of user equipment.

In some implementations, the circuit/module for receiving 1026 is or includes a receiver. In some implementations, the communication interface 1002 includes the circuit/module for receiving 1026 and/or the code for receiving 1038. In some implementations, the circuit/module for receiving 1026 and/or the code for receiving 1038 is configured to control the communication interface 1002 (e.g., a transceiver or a receiver) to receive the information.

The circuit/module for using 1028 may include circuitry and/or programming (e.g., code for using 1040 stored on the storage medium 1004) adapted to perform several functions relating to, for example, using tone locations to transmit information. In some aspects, the information includes uplink control information.

In some implementations, the circuit/module for using 1028 performs the operations that follow. The circuit/module for using 1028 obtains an indication of the tone locations (e.g., from the circuit/module for receiving 1026, the communication interface 1002, the receiver 1016, the memory device 1008, or some other component of the apparatus 1000). The circuit/module for using 1028 encodes information to be transmitted so that the transmitted information is sent via these tone locations (e.g., by upconverting signals). The circuit/module for using 1028 then causes the information to be transmitted. In some scenarios, the circuit/module for using 1028 sends the information to another component of the apparatus 1000 (e.g., the transmitter 1014, the communication interface 1002, or some other component) that will transmit the information to another device. In some scenarios (e.g., if the circuit/module for using 1028 includes a transmitter), the circuit/module for circuit/module for using 1028 transmits the information directly to another device (e.g., the ultimate destination) via radio frequency signaling or some other type of signaling suitable for the applicable communication medium.

In some implementations, the circuit/module for using 1028 is or includes a transmitter. In some implementations, the communication interface 1002 includes the circuit/module for using 1028 and/or the code for using 1040. In some implementations, the circuit/module for using 1028 and/or the code for using 1040 is configured to control the communication interface 1002 (e.g., a transceiver or a transmitter) to send the information.

The circuit/module for applying 1030 may include circuitry and/or programming (e.g., code for applying 1042 stored on the storage medium 1004) adapted to perform several functions relating to, for example, applying a cyclic shift during the transmission of information. In some aspects, the information includes uplink control information.

In some implementations, the circuit/module for applying 1030 performs the operations that follow. The circuit/module for applying 1030 obtains an indication of the cyclic shift (e.g., from the circuit/module for receiving 1026, the communication interface 1002, the receiver 1016, the memory device 1008, or some other component of the apparatus 1000). The circuit/module for applying 1030 encodes information to be transmitted so that the transmitted information is sent using the cyclic shift. The circuit/module for applying 1030 then causes the information to be transmitted. In some scenarios, the circuit/module for applying 1030 sends the information to another component of the apparatus 1000 (e.g., the transmitter 1014, the communication interface 1002, or some other component) that will transmit the information to another device. In some scenarios (e.g., if the circuit/module for applying 1030 includes a transmitter), the circuit/module for circuit/module for applying 1030 transmits the information directly to another device (e.g., the ultimate destination) via radio frequency signaling or some other type of signaling suitable for the applicable communication medium.

In some implementations, the circuit/module for applying 1030 is or includes a transmitter. In some implementations, the communication interface 1002 includes the circuit/module for applying 1030 and/or the code for applying 1042. In some implementations, the circuit/module for applying 1030 and/or the code for applying 1042 is configured to control the communication interface 1002 (e.g., a transceiver or a transmitter) to send the information.

First Example Process

Figure 11:
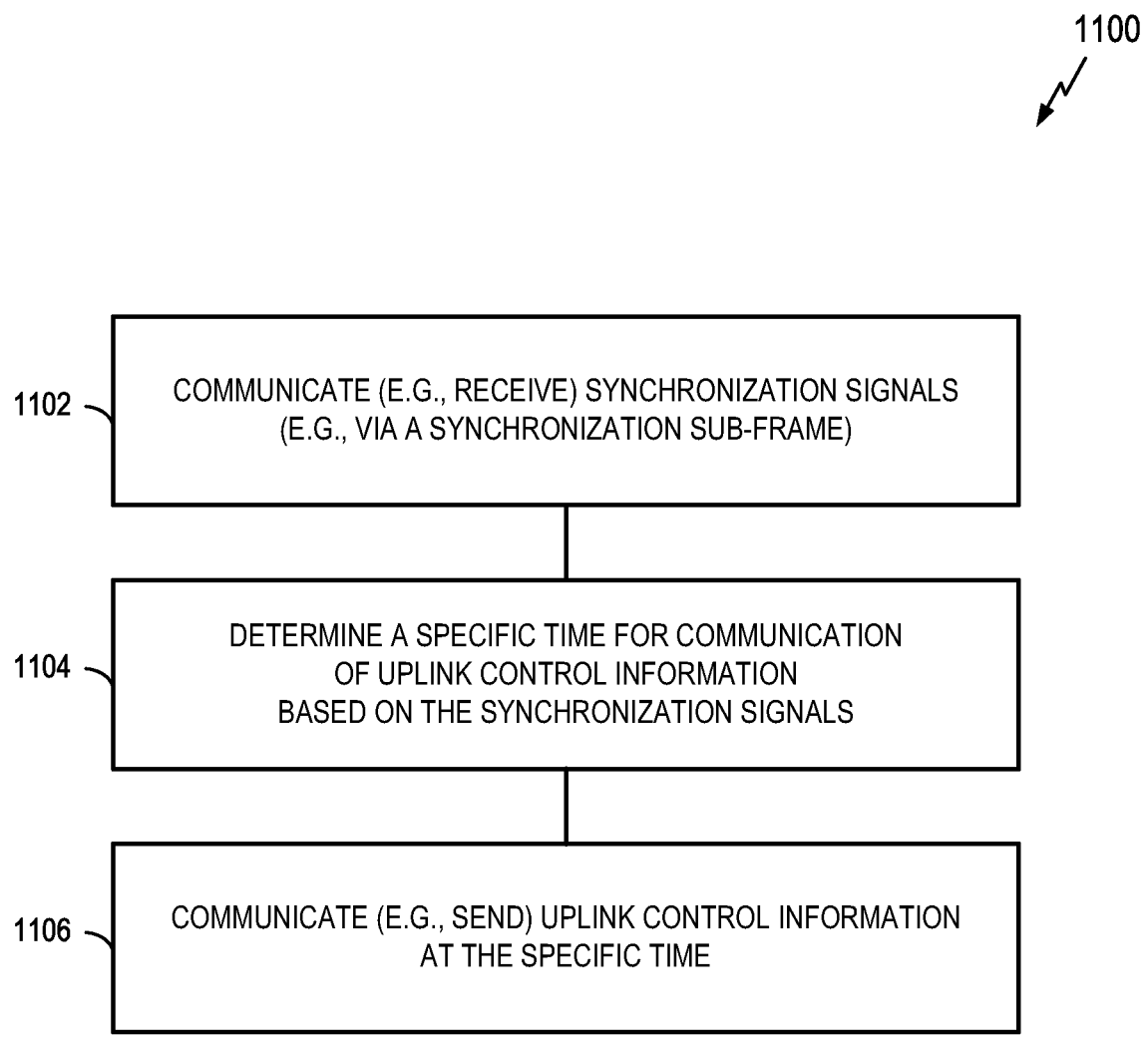
FIG. 11 is a flowchart illustrating an example of a process for communicating uplink control information in accordance with some aspects of the disclosure.

FIG. 11 illustrates a process 1100 for communication in accordance with some aspects of the disclosure. The process 1100 may take place within a processing circuit (e.g., the processing circuit 1010 of FIG. 10), which may be located in a UE, a base station, or some other suitable apparatus. Of course, in various aspects within the scope of the disclosure, the process 1100 may be implemented by any suitable apparatus capable of supporting communication-related operations.

At block 1102, an apparatus (e.g., a UE) communicates (e.g., receives) synchronization signals (e.g., via a synchronization sub-frame). For example, a UE may receive synchronization signals from an eNB or some other device (e.g., a base station, etc.).

The synchronization signals may take different forms in different implementations. In some aspects, the synchronization signals may include primary synchronization signals (e.g., DPSS). In some aspects, the synchronization signals may include secondary synchronization signals (e.g., DSSS).

In some implementations, the circuit/module for receiving 1026 or the circuit/module for communicating 1020 of FIG. 10 performs the operations of block 1102. In some implementations, the code for receiving 1038 or the code for communicating 1032 of FIG. 10 is executed to perform the operations of block 1102.

At block 1104, the apparatus determines a specific time for communication (e.g., transmission) of uplink control information. In some aspects, this determination may be based on the synchronization signals received at block 1102. In some aspects, the determination of the specific time may include determining at least one of: a symbol index, a sub-frame index, a radio frame index, or any combination thereof. In some aspects, the specific time may correspond to specific symbol locations (e.g., within a frame).

The determination of the specific time may be accomplished in different ways in different implementations. In some aspects, the determination of the specific time may include identifying at least one symbol associated with a strongest received signal strength for the synchronization signals. In some aspects, the specific time may be determined based on the identified at least one symbol.

In some aspects, the determination of the specific time may include identifying a particular synchronization signal of the synchronization signals and identifying a timeslot of the particular synchronization signal. In some aspects, the specific time may be determined based on the identified timeslot. In some aspects, the identification of the particular synchronization signal may include determining received signal strengths of the synchronization signals, identifying a strongest one of the received signal strengths, and identifying the particular synchronization signal associated with the strongest one of the received signal strengths.

In some implementations, the circuit/module for determining timing 1022 of FIG. 10 performs the operations of block 1104. In some implementations, the code for determining timing 1034 of FIG. 10 is executed to perform the operations of block 1104.

At block 1106, the apparatus communicates (e.g., sends) the uplink control information at the specific time (e.g., at a designated symbol index, sub-frame index, radio frame index, or some combination thereof). In some aspects, the uplink control information may include physical uplink control channel (PUCCH) information. In some aspects, the uplink control information may include scheduling request information. In some aspects, the uplink control information may include at least one of: channel quality information, precoding matrix information, a scheduling request, acknowledgement information, or any combination thereof.

In some aspects, the communication of the uplink control information involves transmitting the uplink control information by a user equipment. For example, a UE may transmit the uplink control information to an eNB via symbol locations determined at block 1104.

In some implementations, the circuit/module for communicating 1020 of FIG. 10 performs the operations of block 1106. In some implementations, the code for communicating 1032 of FIG. 10 is executed to perform the operations of block 1106.

Second Example Process

Figure 12:
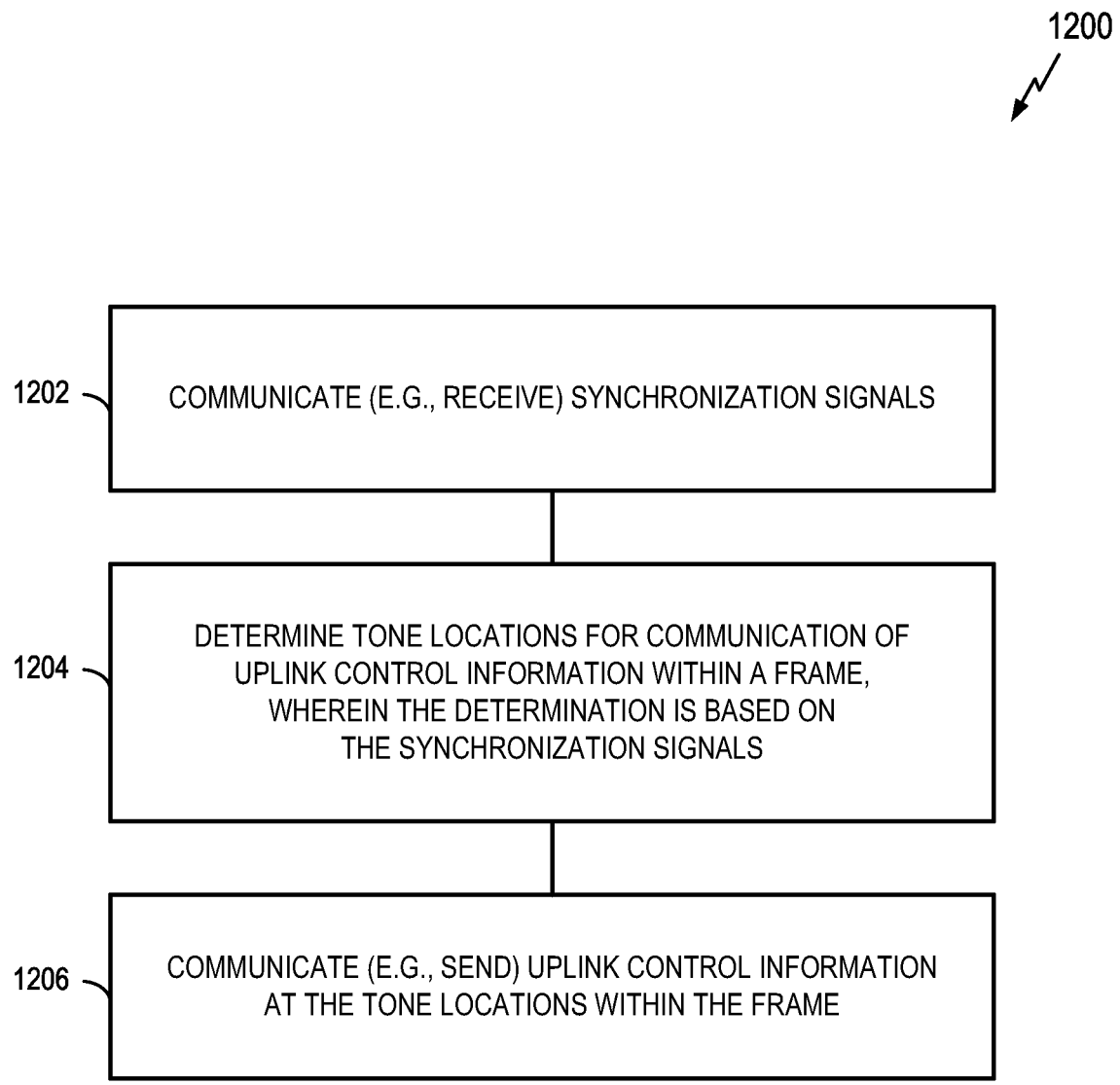
FIG. 12 is a flowchart illustrating an example of a process for determining locations within a frame in accordance with some aspects of the disclosure.

FIG. 12 illustrates a process 1200 for communication in accordance with some aspects of the disclosure. In some aspects, the process 1200 may be performed in conjunction with (e.g., as part of or in addition to) the process 1100 of FIG. 11. The process 1200 may take place within a processing circuit (e.g., the processing circuit 1010 of FIG. 10), which may be located in a UE, a base station, or some other suitable apparatus. Of course, in various aspects within the scope of the disclosure, the process 1200 may be implemented by any suitable apparatus capable of supporting communication-related operations.

At block 1202, an apparatus (e.g., a UE) communicates (e.g., receives) synchronization signals (e.g., from a base station). In some aspects, the operations of block 1202 may correspond to the operations of block 1102 of FIG. 11.

In some implementations, the circuit/module for receiving 1026 or the circuit/module for communicating 1020 of FIG. 10 performs the operations of block 1202. In some implementations, the code for receiving 1038 or the code for communicating 1032 of FIG. 10 is executed to perform the operations of block 1202.

At block 1204, the apparatus determines tone locations for the communication (e.g., the transmission) of the uplink control information within a frame. In some aspects, this determination may be based on the synchronization signals received at block 1202.

In some implementations, the circuit/module for determining tone locations 1024 of FIG. 10 performs the operations of block 1204. In some implementations, the code for determining tone locations 1036 of FIG. 10 is executed to perform the operations of block 1204.

At block 1206, the apparatus communicates (e.g., sends) the uplink control information at the tone locations with the frame. For example, a UE may transmit the uplink control information to an eNB via the tone locations determined at block 1204.

In some implementations, the circuit/module for communicating 1020 of FIG. 10 performs the operations of block 1206. In some implementations, the code for communicating 1032 of FIG. 10 is executed to perform the operations of block 1206.

Third Example Process

Figure 13:
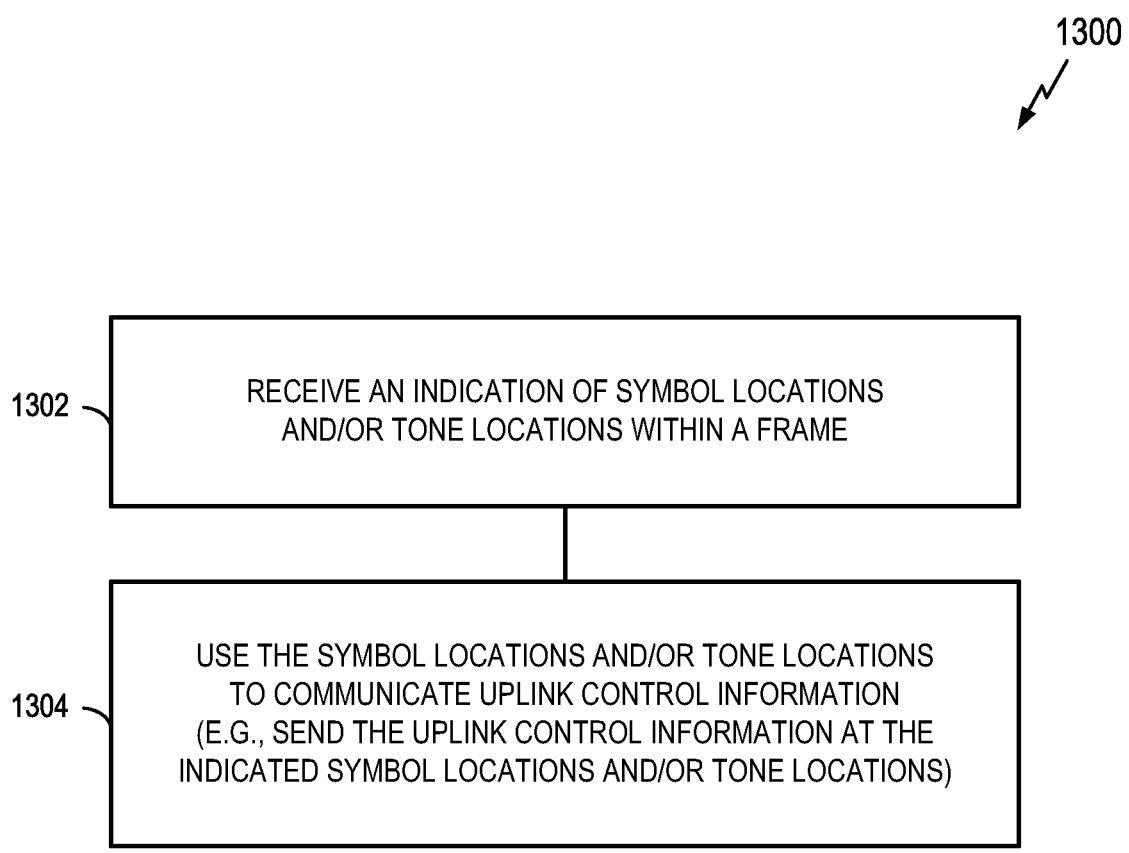
FIG. 13 is a flowchart illustrating an example of another process for communicating uplink control information in accordance with some aspects of the disclosure.

FIG. 13 illustrates a process 1300 for communication in accordance with some aspects of the disclosure. In some aspects, the process 1300 may be performed in conjunction with (e.g., as part of or in addition to) the process 1100 of FIG. 11. The process 1300 may take place within a processing circuit (e.g., the processing circuit 1010 of FIG. 10), which may be located in a UE, a base station, or some other suitable apparatus. Of course, in various aspects within the scope of the disclosure, the process 1300 may be implemented by any suitable apparatus capable of supporting communication-related operations.

At block 1302, an apparatus (e.g., a UE) receives an indication of symbol locations and/or tone locations within a frame (e.g., from a base station). For example, a UE may receive from an eNB an indication of tone locations to be used for communication (e.g., transmission) of uplink control information. Alternatively or in addition, a UE may receive from an eNB an indication of symbol locations (e.g., in addition to symbol locations determined at block 1104) to be used for communication (e.g., transmission) of uplink control information.

In some implementations, the circuit/module for receiving 1026 or the circuit/module for communicating 1020 of FIG. 10 performs the operations of block 1302. In some implementations, the code for receiving 1038 or the code for communicating 1032 of FIG. 10 is executed to perform the operations of block 1302.

At block 1304, the apparatus uses the symbol locations and/or tone locations from block 1302 to communicate (e.g., send) uplink control information. For example, a UE may send (e.g., transmit) uplink control information at the tone locations indicated at block 1302. Alternatively or in addition, a UE may send (e.g., transmit) uplink control information at the symbol locations indicated at block 1302.

In some implementations, the circuit/module for using 1028 or the circuit/module for communicating 1020 of FIG. 10 performs the operations of block 1304. In some implementations, the code for using 1040 or the code for communicating 1032 of FIG. 10 is executed to perform the operations of block 1304.

Fourth Example Process

Figure 14:
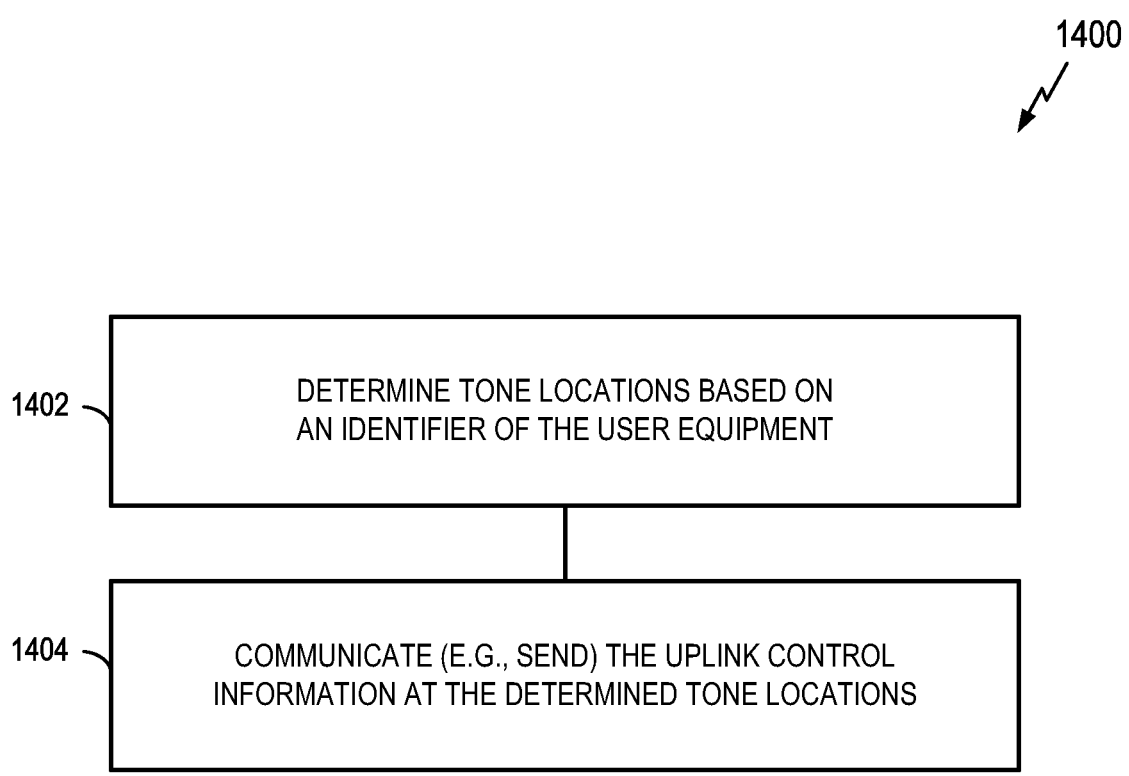
FIG. 14 is a flowchart illustrating an example of another process for communicating uplink control information in accordance with some aspects of the disclosure.

FIG. 14 illustrates a process 1400 for communication in accordance with some aspects of the disclosure. In some aspects, the process 1400 may be performed in conjunction with (e.g., as part of or in addition to) the process 1100 of FIG. 11. The process 1400 may take place within a processing circuit (e.g., the processing circuit 1010 of FIG. 10), which may be located in a UE, a base station, or some other suitable apparatus. Of course, in various aspects within the scope of the disclosure, the process 1400 may be implemented by any suitable apparatus capable of supporting communication-related operations.

At block 1402, an apparatus (e.g., a UE) determines tone locations based on an identifier of a user equipment. In some aspects, this determination may be made according to a mapping between UE identifiers and tone locations.

In some implementations, the circuit/module for determining tone locations 1024 of FIG. 10 performs the operations of block 1402. In some implementations, the code for determining tone locations 1036 of FIG. 10 is executed to perform the operations of block 1402.

At block 1404, the apparatus communicates (e.g., sends) uplink control information at the tone locations determined at block 1402. For example, a UE may send (e.g., transmit) the uplink control information at these tone locations.

In some implementations, the circuit/module for communicating 1020 of FIG. 10 performs the operations of block 1404. In some implementations, the code for communicating 1032 of FIG. 10 is executed to perform the operations of block 1404.

Fifth Example Process

Figure 15:
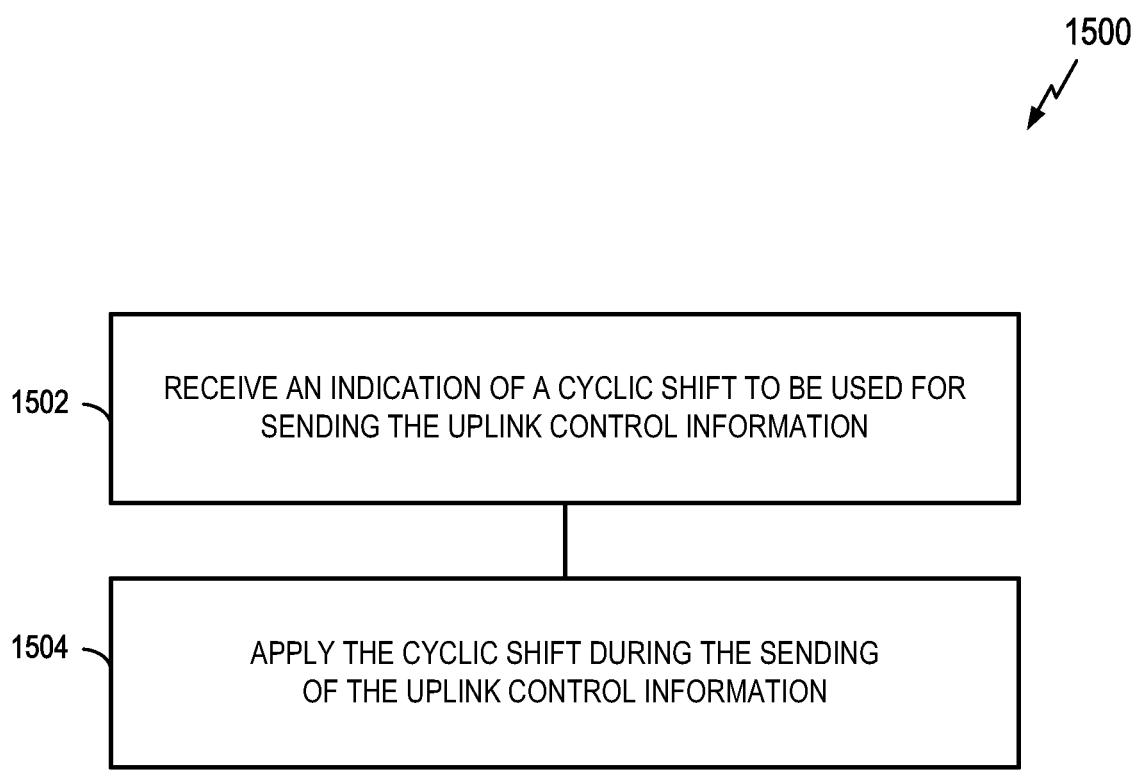
FIG. 15 is a flowchart illustrating an example of a process for applying a cyclic shift in accordance with some aspects of the disclosure.

FIG. 15 illustrates a process 1500 for communication in accordance with some aspects of the disclosure. In some aspects, the process 1500 may be performed in conjunction with (e.g., as part of or in addition to) the process 1100 of FIG. 11. The process 1500 may take place within a processing circuit (e.g., the processing circuit 1010 of FIG. 10), which may be located in a UE, a base station, or some other suitable apparatus. Of course, in various aspects within the scope of the disclosure, the process 1500 may be implemented by any suitable apparatus capable of supporting communication-related operations.

At block 1502, an apparatus (e.g., a UE) receives an indication of a cyclic shift (e.g., from a base station). In some aspects, this cyclic shift is to be used for sending (e.g., transmission of) the uplink control information.

In some implementations, the circuit/module for receiving 1026 or the circuit/module for communicating 1020 of FIG. 10 performs the operations of block 1502. In some implementations, the code for receiving 1038 or the code for communicating 1032 of FIG. 10 is executed to perform the operations of block 1502.

At block 1504, the apparatus applies the cyclic shift during the sending (e.g., transmission) of the uplink control information.

In some implementations, the circuit/module for applying 1030 or the circuit/module for communicating 1020 of FIG. 10 performs the operations of block 1504. In some implementations, the code for applying 1042 or the code for communicating 1032 of FIG. 10 is executed to perform the operations of block 1504.

Sixth Example Process

Figure 16:
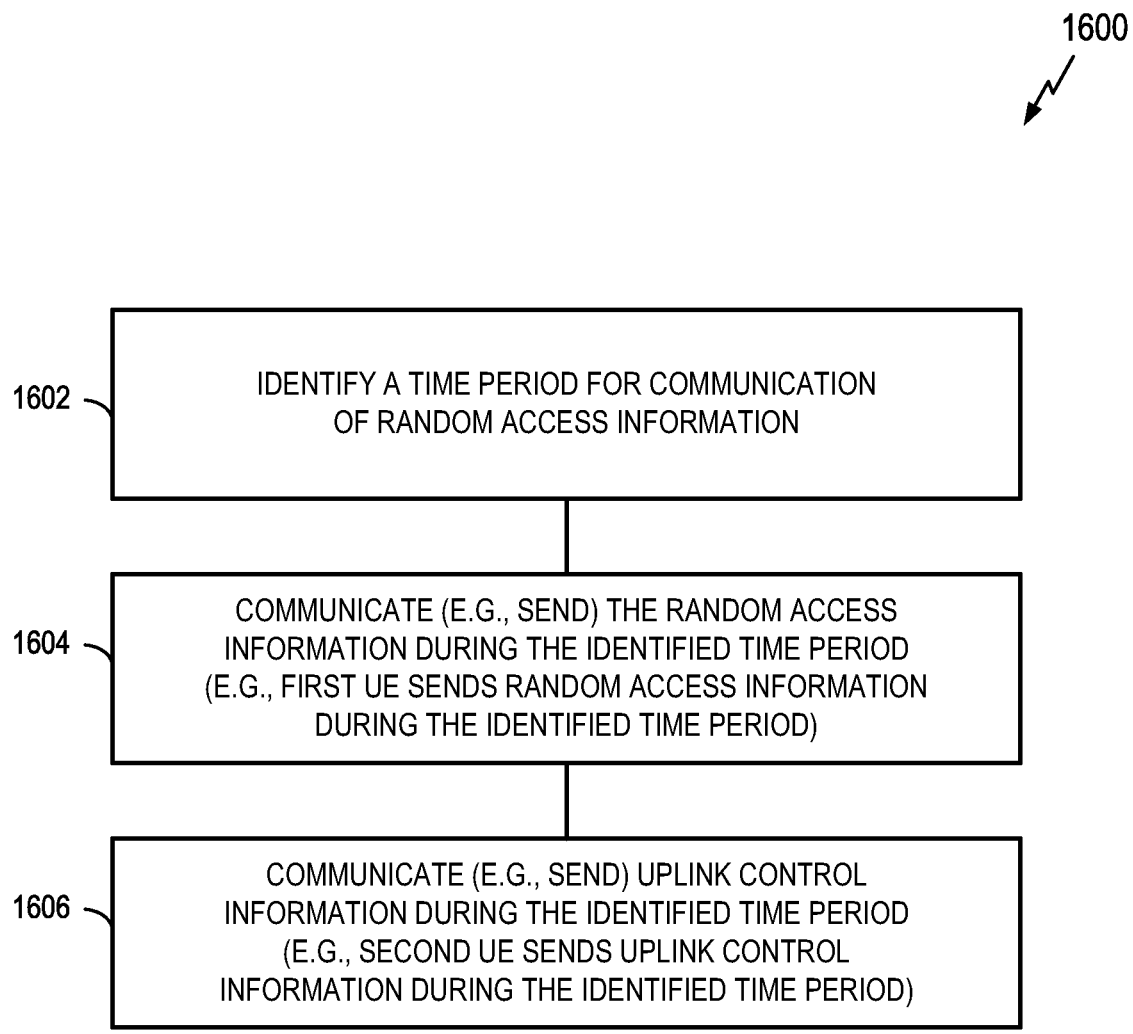
FIG. 16 is a flowchart illustrating an example of another process for communicating uplink control information in accordance with some aspects of the disclosure.

FIG. 16 illustrates a process 1600 for communication in accordance with some aspects of the disclosure. In some aspects, the process 1600 may be performed in conjunction with (e.g., as part of or in addition to) the process 1100 of FIG. 11. The process 1600 may take place within a processing circuit (e.g., the processing circuit 1010 of FIG. 10), which may be located in a UE, a base station, or some other suitable apparatus. Of course, in various aspects within the scope of the disclosure, the process 1600 may be implemented by any suitable apparatus capable of supporting communication-related operations.

At block 1602, an apparatus (e.g., a UE) identifies a time period for communication of random access information. For example, the apparatus may select symbol locations within a frame. In some aspects, a UE may determine a frame index to transmit RACH and PUCCH from synchronization signals.

In some implementations, the circuit/module for communicating 1020 of FIG. 10 performs the operations of block 1602. In some implementations, the code for communicating 1032 of FIG. 10 is executed to perform the operations of block 1602.

At block 1604, an apparatus communicates (e.g., sends, transmits, etc.) the random access information during the identified time period. For example, a first UE (or a first set of UEs) that identified the time period at block 1602 may send random access information during the identified time period. In some aspects, the random access information may be communicated via an inner portion of bandwidth allocated for communication of a frame. In some aspects, the random access information may be random access channel (RACH) information. In some aspects, the communication of the random access information may include communicating the random access information in a directional manner.

In some implementations, the circuit/module for communicating 1020 of FIG. 10 performs the operations of block 1604. In some implementations, the code for communicating 1032 of FIG. 10 is executed to perform the operations of block 1604.

At block 1606, an apparatus communicates (e.g., sends, transmits, etc.) uplink control information during the identified time period. For example, a second UE (or a second set of UEs) that identifies the time period used by a first UE for communicating random access information (at block 1602) may send control information during the identified time period. In some aspects, the random access information and the uplink control information may be communicated as frequency division multiplexed orthogonal tones. In some aspects, the uplink control information and the random access information may be communicated concurrently with each other and exclusive of any other information within a frame. In some aspects, the uplink control information may be communicated via an outer portion of the bandwidth allocated for communication of a frame.

In some implementations, the circuit/module for communicating 1020 of FIG. 10 performs the operations of block 1606. In some implementations, the code for communicating 1032 of FIG. 10 is executed to perform the operations of block 1606.

Second Example Apparatus

Figure 17:
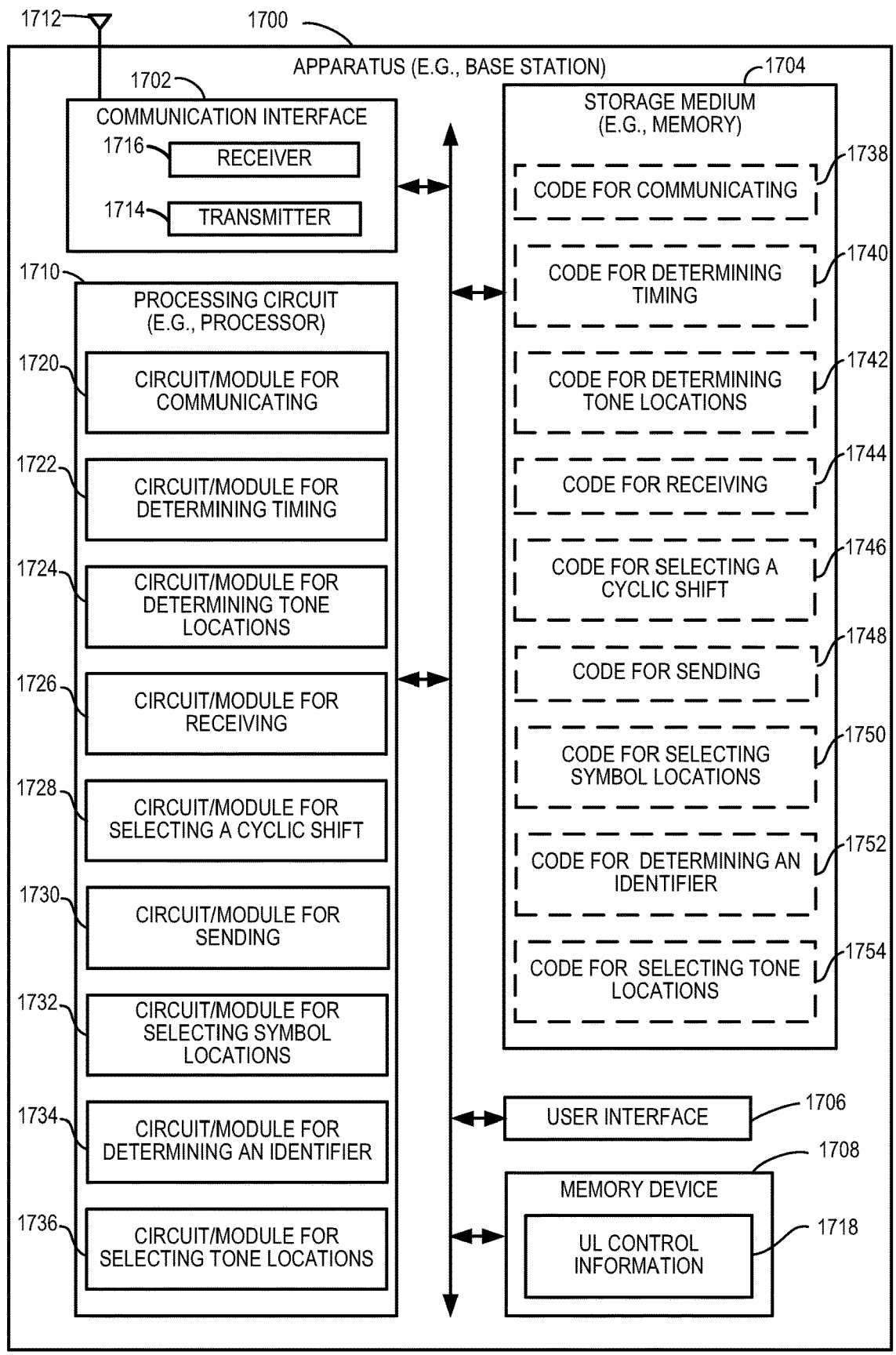
FIG. 17 is a block diagram illustrating an example hardware implementation for another apparatus (e.g., an electronic device) that can support communication in accordance with some aspects of the disclosure.

FIG. 17 illustrates a block diagram of an example hardware implementation of an apparatus 1700 configured to communicate according to one or more aspects of the disclosure. The apparatus 1700 could embody or be implemented within a base station, a UE, or some other type of device that supports wireless communication. In various implementations, the apparatus 1700 could embody or be implemented within an access terminal, an access point, or some other type of device. In various implementations, the apparatus 1700 could embody or be implemented within a mobile phone, a smart phone, a tablet, a portable computer, a server, a personal computer, a sensor, an entertainment device, a medical device, or any other electronic device having circuitry.

The apparatus 1700 includes a communication interface 1702 (e.g., at least one transceiver), a storage medium 1704 (e.g., a memory device), a user interface 1706, a memory device 1708 (e.g., storing uplink control information 1718), and a processing circuit 1710 (e.g., at least one processor). In various implementations, the user interface 1706 may include one or more of: a keypad, a display, a speaker, a microphone, a touchscreen display, of some other circuitry for receiving an input from or sending an output to a user. The communication interface 1702 may be coupled to one or more antennas 1712, and may include a transmitter 1714 and a receiver 1716. In general, the components of FIG. 17 may be similar to corresponding components of the apparatus 1000 of FIG. 10.

According to one or more aspects of the disclosure, the processing circuit 1710 may be adapted to perform any or all of the features, processes, functions, operations and/or routines for any or all of the apparatuses described herein. For example, the processing circuit 1710 may be configured to perform any of the steps, functions, and/or processes described with respect to FIGS. 18-23. As used herein, the term "adapted" in relation to the processing circuit 1710 may refer to the processing circuit 1710 being one or more of configured, employed, implemented, and/or programmed to perform a particular process, function, operation and/or routine according to various features described herein.

The processing circuit 1710 may be a specialized processor, such as an application specific integrated circuit (ASIC) that serves as a means for (e.g., structure for) carrying out any one of the operations described in conjunction with FIGS. 18-25. The processing circuit 1710 serves as one example of a means for transmitting and/or a means for receiving. In various implementations, the processing circuit 1710 may incorporate the functionality of the base station 102 of FIG. 1.

According to at least one example of the apparatus 1700, the processing circuit 1710 may include one or more of a circuit/module for communicating 1720, a circuit/module for determining timing 1722, a circuit/module for determining tone locations 1724, a circuit/module for receiving 1726, a circuit/module for selecting a cyclic shift 1728, a circuit/module for sending 1730, a circuit/module for selecting symbol locations 1732, a circuit/module for determining an identifier 1734, or a circuit/module for selecting tone locations 1736. In various implementations, the circuit/module for communicating 1720, the circuit/module for determining timing 1722, the circuit/module for determining tone locations 1724, the circuit/module for receiving 1726, the circuit/module for selecting a cyclic shift 1728, the circuit/module for sending 1730, the circuit/module for selecting symbol locations 1732, the circuit/module for determining an identifier 1734, or the circuit/module for selecting tone locations 1736 may correspond, at least in part, to the functionality of the base station 102 of FIG. 1.

As mentioned above, programming stored by the storage medium 1704, when executed by the processing circuit 1710, causes the processing circuit 1710 to perform one or more of the various functions and/or process operations described herein. For example, the programming, when executed by the processing circuit 1710, may cause the processing circuit 1710 to perform the various functions, steps, and/or processes described herein with respect to FIGS. 18-25 in various implementations. As shown in FIG. 17, the storage medium 1704 may include one or more of code for communicating 1738, code for determining timing 1740, code for determining tone locations 1742, code for receiving 1744, code for selecting a cyclic shift 1746, code for sending 1748, code for selecting symbol locations 1750, code for determining an identifier 1752, or code for selecting tone locations 1754. In various implementations, the code for communicating 1738, the code for determining timing 1740, the code for determining tone locations 1742, the code for receiving 1744, the code for selecting a cyclic shift 1746, the code for sending 1748, the code for selecting symbol locations 1750, the code for determining an identifier 1752, or the code for selecting tone locations 1754 may be executed or otherwise used to provide the functionality described herein for the circuit/module for communicating 1720, the circuit/module for determining timing 1722, the circuit/module for determining tone locations 1724, the circuit/module for receiving 1726, the circuit/module for selecting a cyclic shift 1728, the circuit/module for sending 1730, the circuit/module for selecting symbol locations 1732, the circuit/module for determining an identifier 1734, or the circuit/module for selecting tone locations 1736, respectively.

The circuit/module for communicating 1720 may include circuitry and/or programming (e.g., code for communicating 1738 stored on the storage medium 1704) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1720 may communicate (e.g., send) synchronization signals. In some aspects, the circuit/module for communicating 1720 may communicate (e.g., receive) uplink control information (e.g., at particular symbol locations within a frame and/or at particular tone locations within a frame). In some aspects, the circuit/module for communicating 1720 may communicate (e.g., receive) random access information (e.g., via a frame). In some aspects, the circuit/module for communicating 1720 may communicate (e.g., send) signals to assist a plurality of UEs to transmit uplink control information. In some aspects, the circuit/module for communicating 1720 may communicate (e.g., send) an indication of timing (e.g., a specific time, selected symbol locations, etc.). In some aspects, the circuit/module for communicating 1720 may communicate (e.g., send) an indication of selected tone locations. In some aspects, the circuit/module for communicating 1720 may communicate (e.g., send) an indication of a selected cyclic shift. In some aspects, the circuit/module for communicating 1720 may communicate (e.g., send and/or receive) an identifier of user equipment.

In some implementation, the circuit/module for communicating 1720 may use one or more parameters for the communicating. For example, the circuit/module for communicating 1720 may select timing (e.g., a specific time, symbol locations, etc.) and/or tone locations and communicate (e.g., receive) information at those locations. As another example, the circuit/module for communicating 1720 may obtain information about a cyclic shift and then use that cyclic shift when communicating (e.g., receiving) information.

In some implementations where the communicating involves receiving information, the circuit/module for communicating 1720 receives information (e.g., from the communication interface 1702, the receiver 1716, the memory device 1708, some other component of the apparatus 1700, or some other device), processes (e.g., decodes) the information, and outputs the information to another component of the apparatus 1700 (e.g., the memory device 1708 or some other component). In some scenarios (e.g., if the circuit/module for communicating 1720 includes a receiver), the communicating involves the circuit/module for communicating 1720 receiving information directly from a device that transmitted the information (e.g., via radio frequency signaling or some other type of signaling suitable for the applicable communication medium).

In some implementations where the communicating involves sending information, the circuit/module for communicating 1720 obtains information (e.g., from the memory device 1708 or some other component of the apparatus 1700), processes (e.g., encodes) the information, and outputs the processed information. In some scenarios, the communicating involves sending the information to another component of the apparatus 1700 (e.g., the transmitter 1714, the communication interface 1702, or some other component) that will transmit the information to another device. In some scenarios (e.g., if the circuit/module for communicating 1720 includes a transmitter), the communicating involves the circuit/module for communicating 1720 transmitting the information directly to another device (e.g., the ultimate destination) via radio frequency signaling or some other type of signaling suitable for the applicable communication medium.

In some implementations, the circuit/module for communicating 1720 is a transceiver. In some implementations, the circuit/module for communicating 1720 is a receiver. In some implementations, the circuit/module for communicating 1720 is a transmitter. In some implementations, the communication interface 1702 includes the circuit/module for communicating 1720 and/or the code for communicating 1738. In some implementations, the circuit/module for communicating 1720 and/or the code for communicating 1738 is configured to control the communication interface 1702 (e.g., a transceiver, a receiver, or a transmitter) to communicate the information.

The circuit/module for determining timing 1722 may include circuitry and/or programming (e.g., code for determining timing 1740 stored on the storage medium 1704) adapted to perform several functions relating to, for example, determining timing (e.g., a specific time) for communication of uplink control information. In some aspects, the determined timing may be used to receive uplink control information. In some aspects, the determined timing may denote at least one of: a symbol index, a sub-frame index, a radio frame index, or any combination thereof. In some aspects, the determined timing may include symbol locations.

In some implementations, the circuit/module for determining timing 1722 performs the operations that follow if the determination of the timing (e.g., a specific time, symbol locations, etc.) is based on synchronization signals. In this case, the circuit/module for determining timing 1722 obtains information about the synchronization signals (e.g., from the circuit/module for communicating 1720, the memory device 1708, the communication interface 1702, the receiver 1716, or some other component). For example, the circuit/module for determining timing 1722 may obtain information about which beams the apparatus 1700 uses to transmit the synchronization signals (e.g., as discussed herein in conjunction with FIG. 4 and/or FIG. 5). The circuit/module for determining timing 1722 may then identify the timing (e.g., a specific time, symbol locations, etc.) to be used for communication based on this information (e.g., as discussed herein in conjunction with FIG. 4 and/or FIG. 5). For example, the circuit/module for determining timing 1722 may identify (e.g., based on a mapping) the timing (e.g., a specific time, a symbol location or symbol locations, etc.) associated with each beam used to transmit the synchronization signals. The circuit/module for determining timing 1722 outputs an indication of the determined timing (e.g., to the circuit/module for communicating 1720, the memory device 1708, the communication interface 1702, the receiver 1716, or some other component).

The circuit/module for determining tone locations 1724 may include circuitry and/or programming (e.g., code for determining tone locations 1736 stored on the storage medium 1704) adapted to perform several functions relating to, for example, determining tone locations for communication of uplink control information within a frame. In some aspects, the determined tone locations may be used to receive uplink control information.

In some implementations, the circuit/module for determining tone locations 1024 performs the operations that follow if the determination of the tone locations is based on synchronization signals. In this case, the circuit/module for determining tone locations 1724 obtains information about the synchronization signals (e.g., from the circuit/module for communicating 1720, the memory device 1708, the communication interface 1702, the receiver 1716, or some other component). For example, the circuit/module for determining tone locations 1724 may obtain information about which beams the apparatus 1700 uses to transmit the synchronization signals (e.g., as discussed herein in conjunction with FIG. 4 and/or FIG. 5). The circuit/module for determining tone locations 1724 may then identify the tone locations to be used for communication based on this information (e.g., as discussed herein in conjunction with FIG. 4 and/or FIG. 5). For example, the circuit/module for determining tone locations 1724 may identify (e.g., based on a mapping) the tone location(s) associated with each beam used to transmit the synchronization signals. The circuit/module for determining tone locations 1724 outputs an indication of the determined tone locations (e.g., to the circuit/module for communicating 1720, the memory device 1708, the communication interface 1702, the receiver 1716, or some other component).

The circuit/module for receiving 1726 may include circuitry and/or programming (e.g., code for receiving 1738 stored on the storage medium 1704) adapted to perform several functions relating to, for example, receiving information. In some implementations, the circuit/module for receiving 1726 performs the operations that follow. The circuit/module for receiving 1726 obtains information (e.g., from the communication interface 1702, the receiver 1716, the memory device 1708, some other component of the apparatus 1700, or some other device), processes (e.g., decodes) the information, and outputs the information to another component of the apparatus 1700 (e.g., the memory device 1708 or some other component). In some scenarios (e.g., if the circuit/module for receiving 1726 includes a receiver), the circuit/module for receiving 1726 receives information directly from a device that transmitted the information (e.g., via radio frequency signaling or some other type of signaling suitable for the applicable communication medium).

The received information may take different forms in different scenarios. In some aspects, the circuit/module for receiving 1726 may receive uplink control information. In some aspects, the circuit/module for receiving 1726 may receive random access information.

In some implementations, the circuit/module for receiving 1726 is or includes a receiver. In some implementations, the communication interface 1702 includes the circuit/module for receiving 1726 and/or the code for receiving 1744. In some implementations, the circuit/module for receiving 1726 and/or the code for receiving 1744 is configured to control the communication interface 1702 (e.g., a transceiver or a receiver) to receive the information.

The circuit/module for selecting a cyclic shift 1728 may include circuitry and/or programming (e.g., code for selecting a cyclic shift 1746 stored on the storage medium 1704) adapted to perform several functions relating to, for example, selecting a cyclic shift to be used for transmission of information. In some scenarios, the information is uplink control information to be transmitted by a UE.

In some implementations, the circuit/module for selecting a cyclic shift 1728 performs the operations that follow. The circuit/module for selecting a cyclic shift 1728 identifies the subcarriers and the symbol locations used by different UEs for communication (e.g., uplink communication). For example, the circuit/module for selecting a cyclic shift 1728 may obtain this information from the communication interface 1702, the memory device 1708, or some other component of the apparatus 1700. The circuit/module for selecting a cyclic shift 1728 determines whether there is potential conflict between the subcarriers and the symbol locations used by different UEs. In the event there is potential conflict between the subcarriers and the symbol locations used by different UEs, the circuit/module for selecting a cyclic shift 1728 assigns a corresponding cyclic shift to one or more of the UEs in a manner that mitigates the potential conflict. Then, for each UE, the circuit/module for selecting a cyclic shift 1728 outputs an indication of the cyclic shift to be used by that UE (e.g., by sending the indication to the circuit/module for communicating 1720, the circuit/module for sending 1730, the memory device 1708, the communication interface 1702, the transmitter 1714, or some other component).

The circuit/module for sending 1730 may include circuitry and/or programming (e.g., code for sending 1748 stored on the storage medium 1704) adapted to perform several functions relating to, for example, sending information.

The information may take different forms in different scenarios. In some aspects, the circuit/module for sending 1730 may send (e.g., transmit) synchronization signals. In some aspects, the circuit/module for sending 1730 may send (e.g., transmit) signals to assist a plurality of UEs to transmit uplink control information. In some aspects, the circuit/module for sending 1730 may send (e.g., transmit) an indication of timing (e.g., a specific time, selected symbol locations, etc.). In some aspects, the circuit/module for sending 1730 may send (e.g., transmit) an indication of selected tone locations. In some aspects, the circuit/module for sending 1730 may send (e.g., transmit) an indication of a selected cyclic shift. In some aspects, the circuit/module for sending 1730 may send (e.g., transmit) an identifier of user equipment.

In some implementations, the circuit/module for sending 1730 performs the operations that follow. The circuit/module for sending 1730 obtains information (e.g., from the memory device 1708, the circuit/module for selecting a cyclic shift 1728, the circuit/module for selecting symbol locations 1732, the circuit/module for determining an identifier 1734, the circuit/module for selecting tone locations 1736, or some other component of the apparatus 1700). The circuit/module for sending 1730 then processes (e.g., encodes) the information and outputs the processed information. In some scenarios, the circuit/module for sending 1730 sends the information to another component of the apparatus 1700 (e.g., the transmitter 1714, the communication interface 1702, or some other component) that will transmit the information to another device. In some scenarios (e.g., if the circuit/module for sending 1730 includes a transmitter), the circuit/module for sending 1730 transmits the information directly to another device (e.g., the ultimate destination) via radio frequency signaling or some other type of signaling suitable for the applicable communication medium.

In some implementations, the circuit/module for sending 1730 is or includes a transmitter. In some implementations, the communication interface 1702 includes the circuit/module for sending 1730 and/or the code for sending 1748. In some implementations, the circuit/module for sending 1730 and/or the code for sending 1748 is configured to control the communication interface 1702 (e.g., a transceiver or a transmitter) to send the information.

The circuit/module for selecting symbol locations 1732 may include circuitry and/or programming (e.g., code for selecting symbol locations 1750 stored on the storage medium 1704) adapted to perform several functions relating to, for example, selecting symbol locations within a frame for communication of information. In some scenarios, the information is uplink information to be transmitted by a UE.

In some implementations, the circuit/module for selecting symbol locations 1732 performs the operations that follow. The circuit/module for selecting symbol locations 1732 identifies the symbol locations used by different UEs for communication (e.g., uplink communication). For example, the circuit/module for selecting symbol locations 1732 may obtain this information from the communication interface 1702, the memory device 1708, or some other component of the apparatus 1700. The circuit/module for selecting symbol locations 1732 determines whether there is potential conflict between the symbol locations used by different UEs. In the event there is potential conflict between the symbol locations used by different UEs, the circuit/module for selecting symbol locations 1732 assigns one or more corresponding symbol locations to one or more of the UEs in a manner that mitigates the potential conflict. Then, for each UE, the circuit/module for selecting symbol locations 1732 outputs an indication of the symbol locations to be used by that UE (e.g., by sending the indication to the circuit/module for communicating 1720, the circuit/module for sending 1730, the memory device 1708, the communication interface 1702, the transmitter 1714, or some other component).

In some implementations, the circuit/module for selecting symbol locations 1732 performs the operations that follow if the selection of the symbol locations is based on an identifier of a user equipment. In this case, the circuit/module for selecting symbol locations 1732 obtains the identifier (e.g., from the circuit/module for communicating 1720, the memory device 1708, the communication interface 1702, the receiver 1716, or some other component). The circuit/module for selecting symbol locations 1732 uses an identifier-to-symbol location mapping (e.g., in the form of a table, an algorithm, or some other suitable mapping) to identify the symbol location or locations associated with that identifier. The circuit/module for selecting symbol locations 1732 then outputs an indication of the determined symbol locations (e.g., to the circuit/module for communicating 1720, the memory device 1708, the communication interface 1702, the transmitter 1714, or some other component).

The circuit/module for determining an identifier 1734 may include circuitry and/or programming (e.g., code for determining an identifier 1752 stored on the storage medium 1704) adapted to perform several functions relating to, for example, determining an identifier for a UE. In some aspects, the identifier may be associated with particular tone locations.

In some implementations, the circuit/module for determining an identifier 1734 performs the operations that follow. The circuit/module for determining an identifier 1734 identifies the tone locations selected for a particular UE for communication (e.g., uplink communication). For example, the circuit/module for determining an identifier 1734 may obtain this information from the circuit/module for selecting tone locations 1736, the communication interface 1702, the memory device 1708, or some other component of the apparatus 1700. The circuit/module for determining an identifier 1734 may then access a mapping of tone locations and identifiers to determine which identifier corresponds to the selected tone locations. The circuit/module for determining an identifier 1734 then outputs an indication of the determined identifier (e.g., to the circuit/module for sending 1730, the circuit/module for communicating 1720, the memory device 1708, the communication interface 1702, the transmitter 1714, or some other component).

The circuit/module for selecting tone locations 1736 may include circuitry and/or programming (e.g., code for selecting tone locations 1754 stored on the storage medium 1704) adapted to perform several functions relating to, for example, selecting tone locations within a frame for communication of information. In some scenarios, the information is uplink information to be transmitted by a UE.

In some implementations, the circuit/module for selecting tone locations 1736 performs the operations that follow. The circuit/module for selecting tone locations 1736 identifies the tone locations used by different UEs for communication (e.g., uplink communication). For example, the circuit/module for selecting tone locations 1736 may obtain this information from the communication interface 1702, the memory device 1708, or some other component of the apparatus 1700. The circuit/module for selecting tone locations 1736 determines whether there is potential conflict between the tone locations used by different UEs. In the event there is potential conflict between the tone locations used by different UEs, the circuit/module for selecting tone locations 1736 assigns one or more corresponding tone locations to one or more of the UEs in a manner that mitigates the potential conflict. Then, for each UE, the circuit/module for selecting tone locations 1736 outputs an indication of the tone locations to be used by that UE (e.g., by sending the indication to the circuit/module for communicating 1720, the circuit/module for sending 1730, the memory device 1708, the communication interface 1702, the transmitter 1714, or some other component).

In some implementations, the circuit/module for selecting tone locations 1736 performs the operations that follow if the selection of the tone locations is based on an identifier of a user equipment. In this case, the circuit/module for selecting tone locations 1736 obtains the identifier (e.g., from the circuit/module for communicating 1720, the memory device 1708, the communication interface 1702, the receiver 1716, or some other component). The circuit/module for selecting tone locations 1736 uses an identifier-to-tone location mapping (e.g., in the form of a table, an algorithm, or some other suitable mapping) to identify the tone location or locations associated with that identifier. The circuit/module for selecting tone locations 1736 then outputs an indication of the determined tone locations (e.g., to the circuit/module for communicating 1720, the memory device 1708, the communication interface 1702, the transmitter 1714, or some other component).

Seventh Example Process

Figure 18:
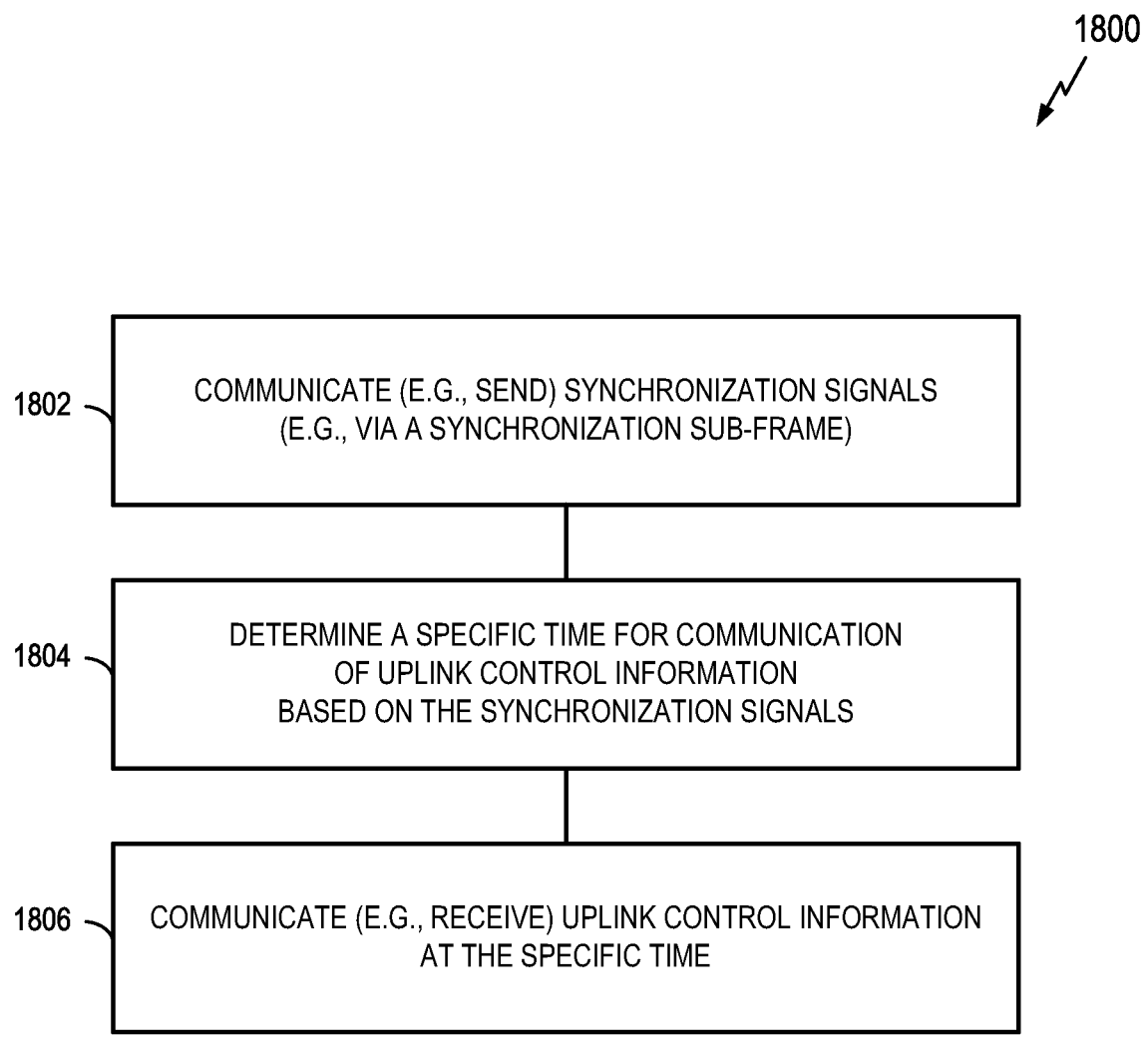
FIG. 18 is a flowchart illustrating an example of another process for communicating uplink control information in accordance with some aspects of the disclosure.

FIG. 18 illustrates a process 1800 for communication in accordance with some aspects of the disclosure. The process 1800 may take place within a processing circuit (e.g., the processing circuit 1710 of FIG. 17), which may be located in a base station, a UE, or some other suitable apparatus. Of course, in various aspects within the scope of the disclosure, the process 1800 may be implemented by any suitable apparatus capable of supporting communication-related operations.

At block 1802, an apparatus (e.g., a base station) communicates (e.g., sends) synchronization signals (e.g., via a synchronization sub-frame). For example, an eNB may send (e.g., transmit) synchronization signals to one or more UEs.

The synchronization signals may take different forms in different implementations. In some aspects, the synchronization signals may include primary synchronization signals (e.g., DPSS). In some aspects, the synchronization signals may include secondary synchronization signals (e.g., DSSS).

In some implementations, the circuit/module for sending 1730 or the circuit/module for communicating 1720 of FIG. 17 performs the operations of block 1802. In some implementations, the code for sending 1748 or the code for communicating 1738 of FIG. 17 is executed to perform the operations of block 1802.

At block 1804, the apparatus determines a specific time for communication of uplink control information. In some aspects, this determination may be based on the synchronization signals communicated at block 1802. In some aspects, the determination of the specific time may include determining at least one of: a symbol index, a sub-frame index, a radio frame index, or any combination thereof. In some aspects, the specific time may correspond to specific symbol locations (e.g., within a frame).

In some implementations, the circuit/module for determining timing 1722 of FIG. 17 performs the operations of block 1804. In some implementations, the code for determining timing 1740 of FIG. 17 is executed to perform the operations of block 1804.

At block 1806, the apparatus communicates (e.g., receives) the uplink control information at the specific time (e.g., at a designated symbol index, sub-frame index, radio frame index, or some combination thereof). In some aspects, the uplink control information may include physical uplink control channel (PUCCH) information. In some aspects, the uplink control information may include scheduling request information. In some aspects, the uplink control information may include at least one of: channel quality information, precoding matrix information, a scheduling request, acknowledgement information, or any combination thereof.

In some aspects, the communication of the uplink control information includes receiving the uplink control information by a base station. For example, an eNB may receive the uplink control information from a UE via symbol locations determined at block 1804.

In some implementations, the circuit/module for receiving 1726 or the circuit/module for communicating 1720 of FIG. 17 performs the operations of block 1806. In some implementations, the code for receiving 1744 or the code for communicating 1738 of FIG. 17 is executed to perform the operations of block 1806.

Eighth Example Process

Figure 19:
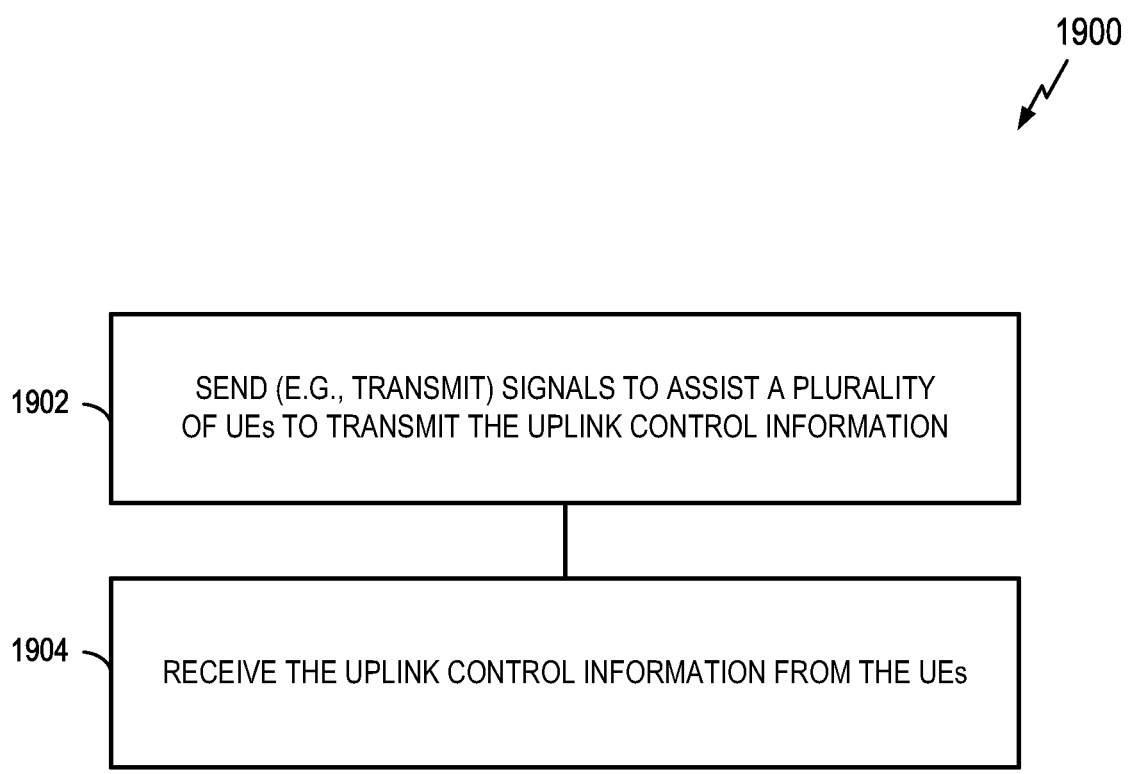
FIG. 19 is a flowchart illustrating an example of another process for communicating uplink control information in accordance with some aspects of the disclosure.

FIG. 19 illustrates a process 1900 for communication in accordance with some aspects of the disclosure. In some aspects, the process 1900 may be performed in conjunction with (e.g., as part of or in addition to) the process 1800 of FIG. 18. The process 1900 may take place within a processing circuit (e.g., the processing circuit 1710 of FIG. 17), which may be located in a base station, a UE, or some other suitable apparatus. Of course, in various aspects within the scope of the disclosure, the process 1900 may be implemented by any suitable apparatus capable of supporting communication-related operations.

At block 1902, an apparatus (e.g., a base station) sends (e.g., transmits) signals to assist a plurality of UEs to transmit the uplink control information. These signals may include, for example, one or more of: a signal transmitted during a synchronization sub-frame, a radio resource control (RRC) signal (e.g., indicating symbol locations, tone locations, cyclic shift, etc.) transmitted during downlink traffic transmission, or some other signal.

In some implementations, the circuit/module for sending 1730 or the circuit/module for communicating 1720 of FIG. 17 performs the operations of block 1902. In some implementations, the code for sending 1748 or the code for communicating 1738 of FIG. 17 is executed to perform the operations of block 1902.

At block 1904, the apparatus receives the uplink control information from the UEs.

In some implementations, the circuit/module for receiving 1726 or the circuit/module for communicating 1720 of FIG. 17 performs the operations of block 1904. In some implementations, the code for receiving 1744 or the code for communicating 1738 of FIG. 17 is executed to perform the operations of block 1904.

Ninth Example Process

Figure 20:
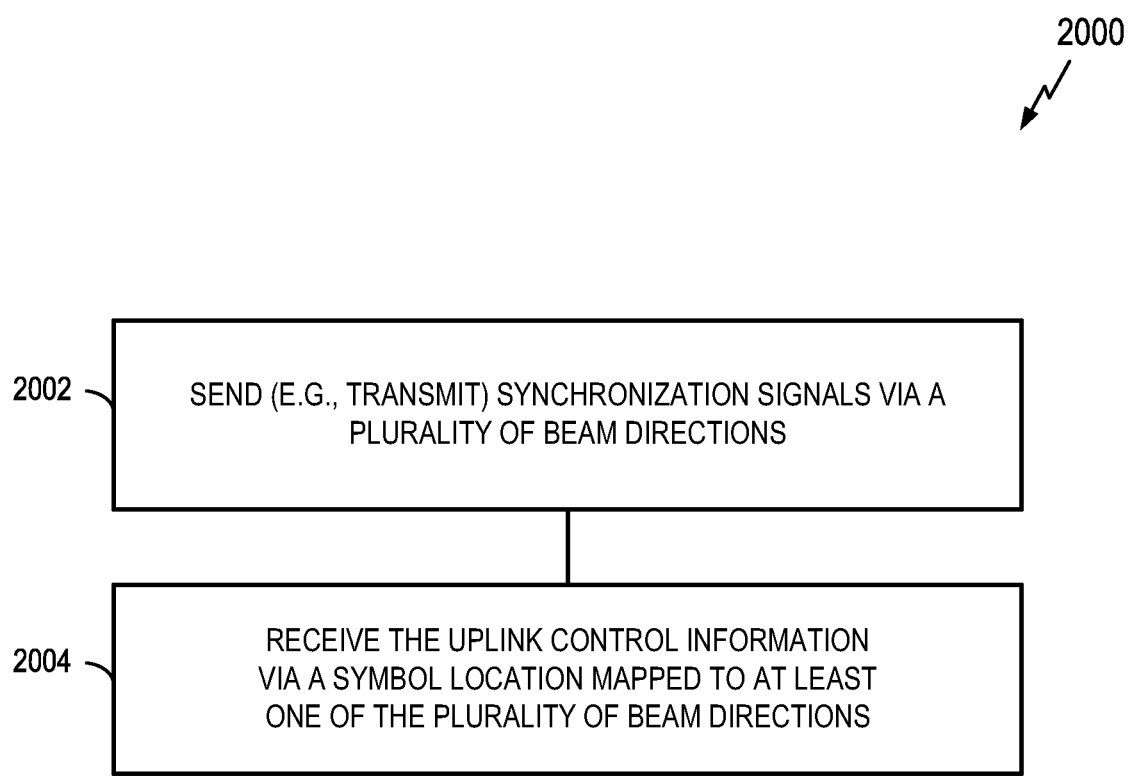
FIG. 20 is a flowchart illustrating an example of another process for communicating uplink control information in accordance with some aspects of the disclosure.

FIG. 20 illustrates a process 2000 for communication in accordance with some aspects of the disclosure. In some aspects, the process 2000 may be performed in conjunction with (e.g., as part of or in addition to) the process 1800 of FIG. 18. The process 2000 may take place within a processing circuit (e.g., the processing circuit 1710 of FIG. 17), which may be located in a base station, a UE, or some other suitable apparatus. Of course, in various aspects within the scope of the disclosure, the process 2000 may be implemented by any suitable apparatus capable of supporting communication-related operations.

At block 2002, an apparatus (e.g., a base station) sends (e.g., transmits) synchronization signals via a plurality of beam directions.

In some implementations, the circuit/module for sending 1730 or the circuit/module for communicating 1720 of FIG. 17 performs the operations of block 2002. In some implementations, the code for sending 1748 or the code for communicating 1738 of FIG. 17 is executed to perform the operations of block 2002.

At block 2004, the apparatus receives the uplink control information via a symbol location mapped to at least one of the plurality of beam directions. For example, a base station can transmit synchronization sub-frame signals using beams 1, 2, 3, and 4 in time slots 1, 2, 3, and 4. On the other hand, the base station can receive DRACH using beams 5 and 6 in time slots 5 and 6. Beams 5 and 6 can be wider than beam 1, 2, 3, and 4. DRACH beam 5 can cover the angular regions of synchronization sub-frame signal beams 1 and 2. DRACH beam 6 can cover the angular regions of synchronization sub-frame signal beams 3 and 4. In this case, the UEs will still find its symbol location based on synchronization sub-frame signal beam ID. If the best synchronization sub-frame signal beam is #2, the UE will transmit PUCCH in symbol 5. If the best synchronization sub-frame signal beam is #3, the UE will transmit PUCCH in time slot 6. In other words, there may be a one-to-one correspondence from a synchronization sub-frame signal beam ID to a DRACH symbol location. The base station does not necessarily need to receive in the same set of beam directions.

In some implementations, the circuit/module for receiving 1726 or the circuit/module for communicating 1720 of FIG. 17 performs the operations of block 2004. In some implementations, the code for receiving 1744 or the code for communicating 1738 of FIG. 17 is executed to perform the operations of block 2004.

Tenth Example Process

Figure 21:
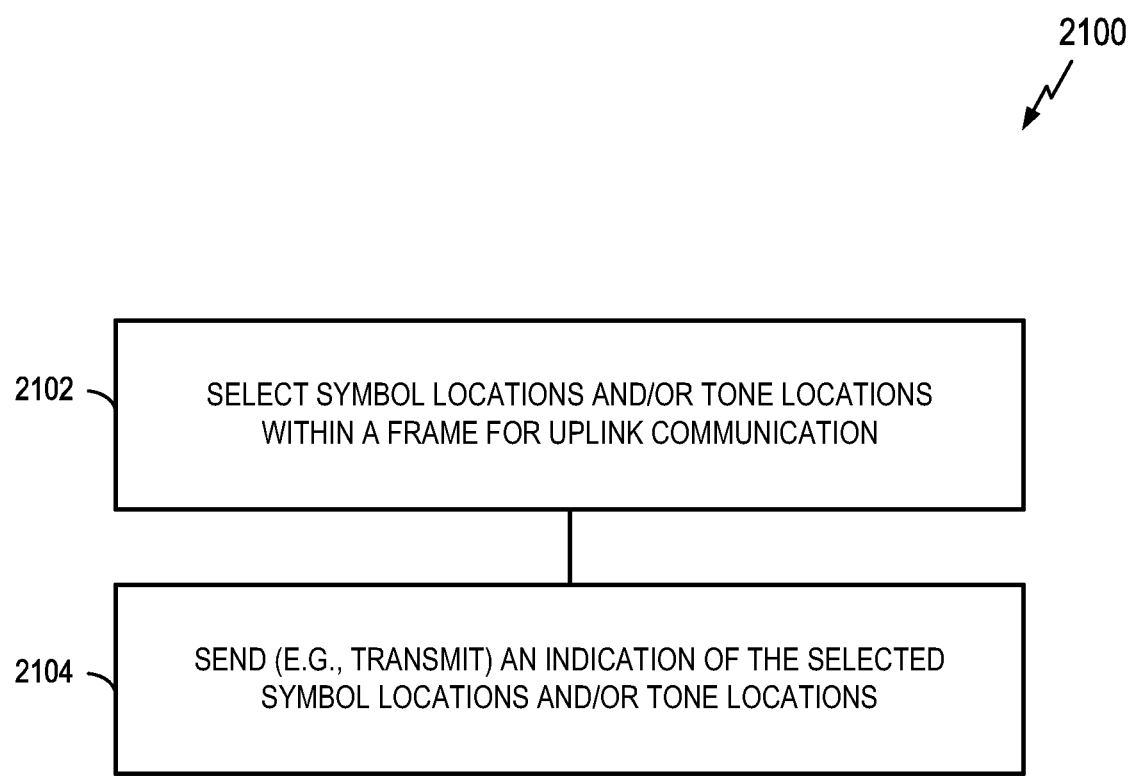
FIG. 21 is a flowchart illustrating an example of a process for selecting locations within a frame in accordance with some aspects of the disclosure.

FIG. 21 illustrates a process 2100 for communication in accordance with some aspects of the disclosure. In some aspects, the process 2100 may be performed in conjunction with (e.g., as part of or in addition to) the process 1800 of FIG. 18. The process 2100 may take place within a processing circuit (e.g., the processing circuit 1710 of FIG. 17), which may be located in a base station, a UE, or some other suitable apparatus. Of course, in various aspects within the scope of the disclosure, the process 2100 may be implemented by any suitable apparatus capable of supporting communication-related operations.

At block 2102, an apparatus (e.g., a base station) selects symbol locations and/or tone locations within a frame for uplink communication. For example, a base station may select symbol locations (e.g., in addition to symbol locations determined at block 1804) for uplink communication according to at least one criterion (e.g., a scheduling process). Alternatively or in addition, a base station may select tone locations for uplink communication according to at least one criterion.

In some implementations, the circuit/module for selecting symbol locations 1732 of FIG. 17 performs the operations of block 2102. In some implementations, the code for selecting symbol locations 1750 of FIG. 17 is executed to perform the operations of block 2102.

At block 2104, the apparatus sends (e.g., transmits) an indication of the symbol locations and/or tone locations selected at block 2102. For example, a base station may send an indication of the selected symbol locations to at least one UE. Alternatively or in addition, a base station may send an indication of the selected tone locations to at least one UE.

In some implementations, the circuit/module for sending 1730 or the circuit/module for communicating 1720 of FIG. 17 performs the operations of block 2104. In some implementations, the code for sending 1748 or the code for communicating 1738 of FIG. 17 is executed to perform the operations of block 2104.

Eleventh Example Process

Figure 22:
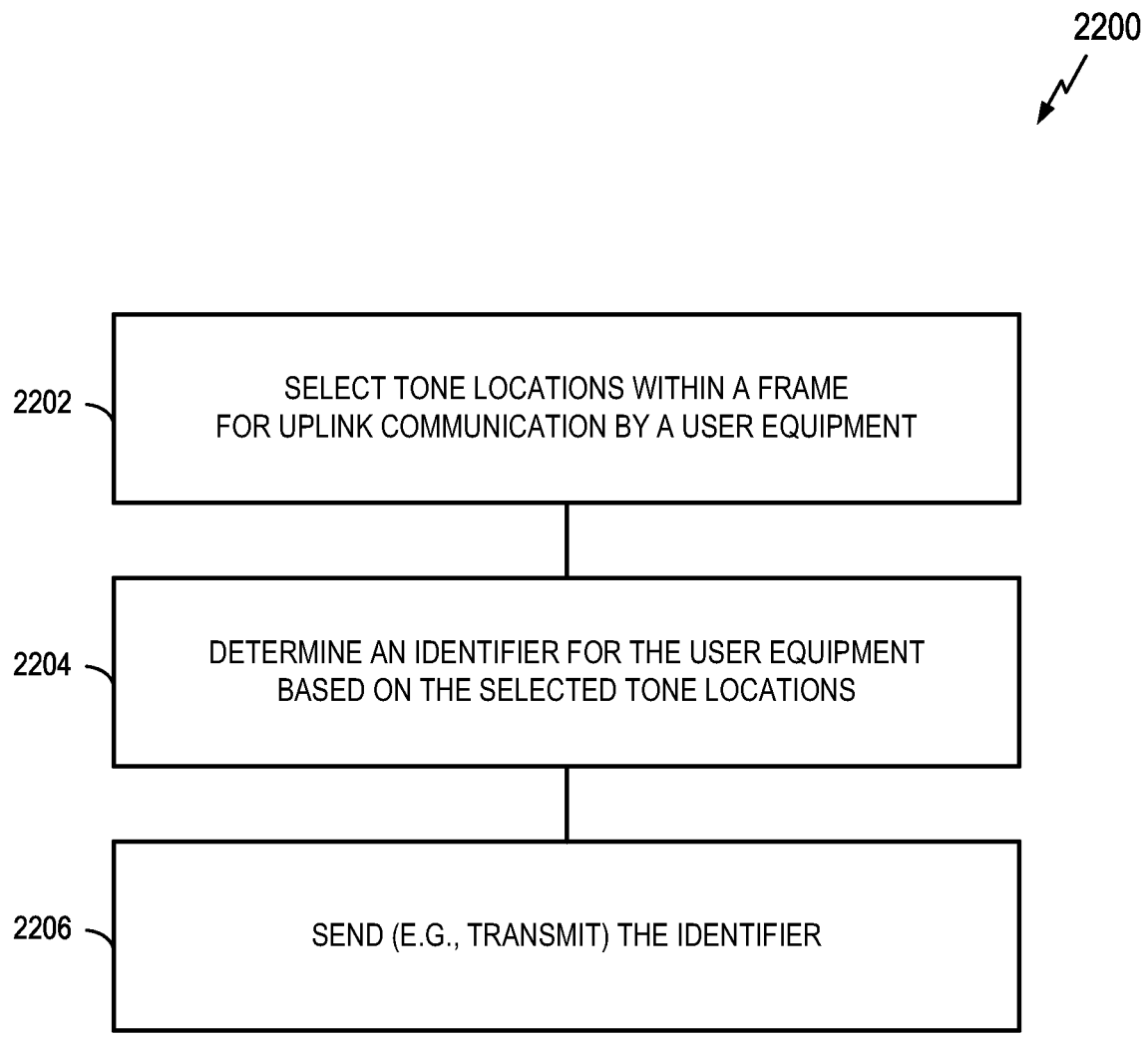
FIG. 22 is a flowchart illustrating an example of a process for selecting tone locations within a frame in accordance with some aspects of the disclosure.

FIG. 22 illustrates a process 2200 for communication in accordance with some aspects of the disclosure. In some aspects, the process 2200 may be performed in conjunction with (e.g., as part of or in addition to) the process 1800 of FIG. 18. The process 2200 may take place within a processing circuit (e.g., the processing circuit 1710 of FIG. 17), which may be located in a base station, a UE, or some other suitable apparatus. Of course, in various aspects within the scope of the disclosure, the process 2200 may be implemented by any suitable apparatus capable of supporting communication-related operations.

At block 2202, an apparatus (e.g., a base station) selects tone locations within a frame for uplink communication by a UE. For example, the base station may select non-conflicting tone locations. Other tone location selection criteria could be used in other scenarios.

In some implementations, the circuit/module for selecting tone locations 1736 of FIG. 17 performs the operations of block 2202. In some implementations, the code for selecting tone locations 1754 of FIG. 17 is executed to perform the operations of block 2202.

At block 2204, the apparatus determines an identifier for the UE based on the tone locations selected at block 2202. For example, the apparatus may access a mapping of tone locations and identifiers to determine which identifier corresponds to the selected tone locations.

In some implementations, the circuit/module for determining an identifier 1734 of FIG. 17 performs the operations of block 2204. In some implementations, the code for determining an identifier 1752 of FIG. 17 is executed to perform the operations of block 2204.

At block 2206, the apparatus sends (e.g., transmits) the identifier determined at block 2204. For example, a base station may send this identifier to the UE of block 2202.

In some implementations, the circuit/module for sending 1730 or the circuit/module for communicating 1720 of FIG. 17 performs the operations of block 2206. In some implementations, the code for sending 1748 or the code for communicating 1738 of FIG. 17 is executed to perform the operations of block 2206.

Twelfth Example Process

Figure 23:
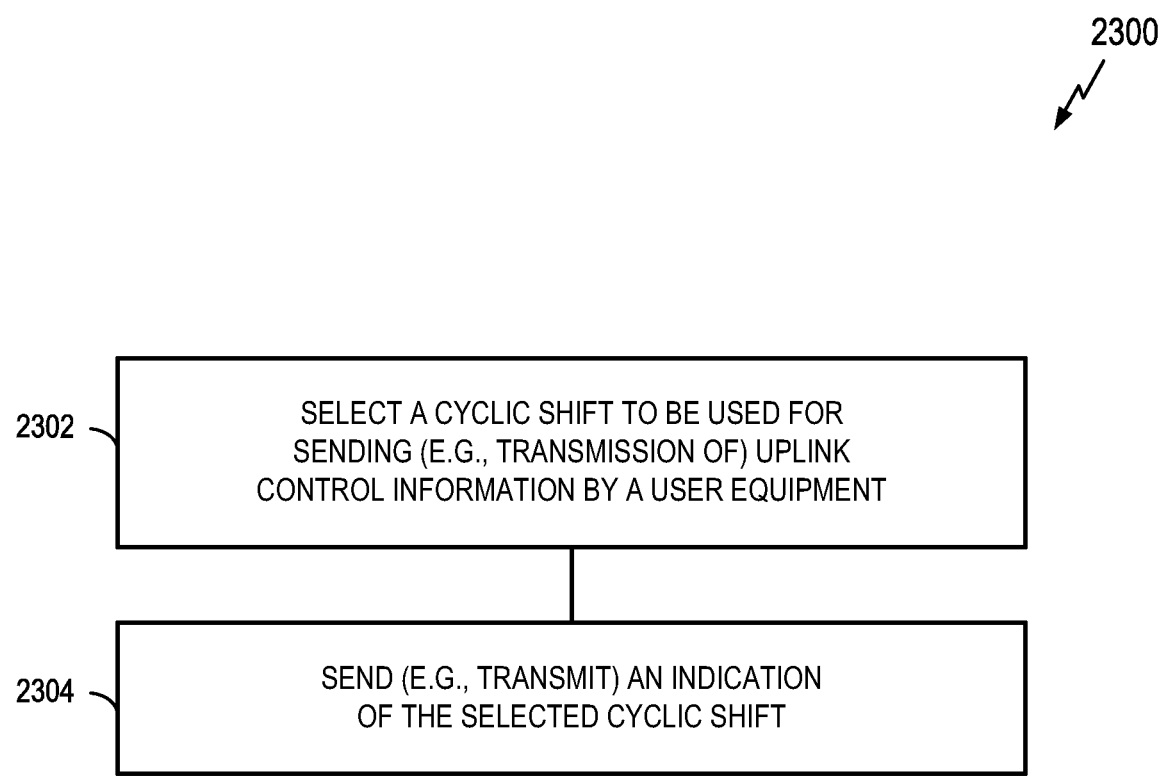
FIG. 23 is a flowchart illustrating an example of a process for selecting a cyclic shift in accordance with some aspects of the disclosure.

FIG. 23 illustrates a process 2300 for communication in accordance with some aspects of the disclosure. In some aspects, the process 2300 may be performed in conjunction with (e.g., as part of or in addition to) the process 1800 of FIG. 18. The process 2300 may take place within a processing circuit (e.g., the processing circuit 1710 of FIG. 17), which may be located in a base station, a UE, or some other suitable apparatus. Of course, in various aspects within the scope of the disclosure, the process 2300 may be implemented by any suitable apparatus capable of supporting communication-related operations.

At block 2302, an apparatus (e.g., a base station) selects a cyclic shift to be used for transmission of uplink control information by a UE.

In some implementations, the circuit/module for selecting a cyclic shift 1728 of FIG. 17 performs the operations of block 2302. In some implementations, the code for selecting a cyclic shift 1746 of FIG. 17 is executed to perform the operations of block 2302.

At block 2304, the apparatus sends (e.g., transmits) an indication of the selected cyclic shift.

In some implementations, the circuit/module for sending 1730 or the circuit/module for communicating 1720 of FIG. 17 performs the operations of block 2304. In some implementations, the code for sending 1748 or the code for communicating 1738 of FIG. 17 is executed to perform the operations of block 2304.

Thirteenth Example Process

Figure 24:
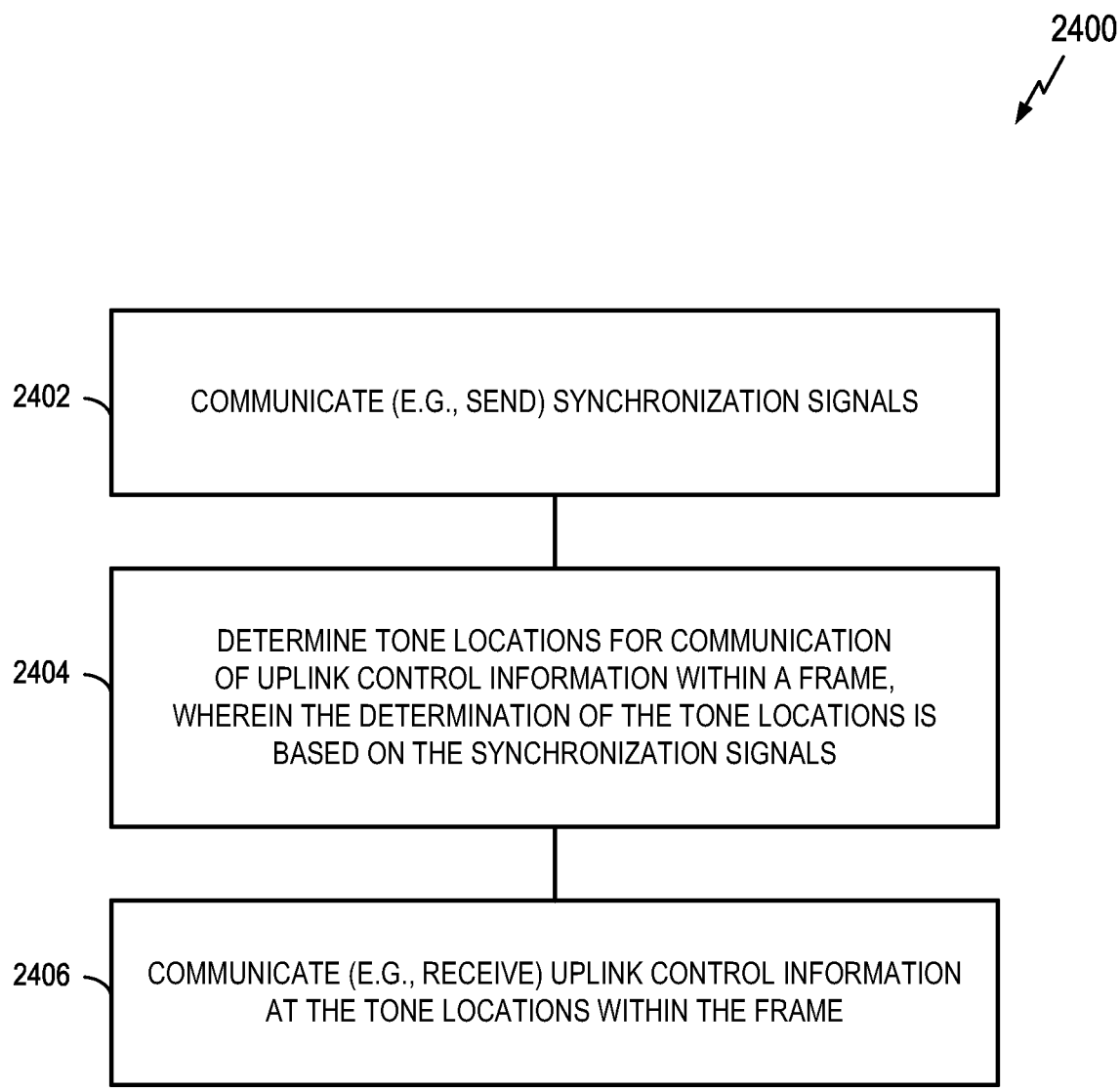
FIG. 24 is a flowchart illustrating an example of another process for communicating uplink control information in accordance with some aspects of the disclosure.

FIG. 24 illustrates a process 2400 for communication in accordance with some aspects of the disclosure. In some aspects, the process 2400 may be performed in conjunction with (e.g., as part of or in addition to) the process 1800 of FIG. 18. The process 2400 may take place within a processing circuit (e.g., the processing circuit 1710 of FIG. 17), which may be located in a base station, a UE, or some other suitable apparatus. Of course, in various aspects within the scope of the disclosure, the process 2400 may be implemented by any suitable apparatus capable of supporting communication-related operations.

At block 2402, an apparatus (e.g., a base station) communicates (e.g., sends, transmits, etc.) synchronization signals. For example, an eNB may transmit synchronization signals to nearby UEs. In some aspects, the operations of block 2402 may correspond to the operations of block 1802 of FIG. 18.

In some implementations, the circuit/module for sending 1730 or the circuit/module for communicating 1720 of FIG. 17 performs the operations of block 2402. In some implementations, the code for sending 1748 or the code for communicating 1738 of FIG. 17 is executed to perform the operations of block 2402.

At block 2404, the apparatus determines tone locations for communication of uplink control information within a frame. In some aspects, this determination may be based on the synchronization signals transmitted at block 2402.

In some implementations, the circuit/module for determining tone locations 1724 of FIG. 17 performs the operations of block 2404. In some implementations, the code for determining tone locations 1742 of FIG. 17 is executed to perform the operations of block 2204.

At block 2406, the apparatus communicates (e.g., receives) the uplink control information at the tone locations with the frame. For example, an eNB may receive the uplink control information from a UE via the tone locations determined at block 2404.

In some implementations, the circuit/module for receiving 1726 or the circuit/module for communicating 1720 of FIG. 17 performs the operations of block 2406. In some implementations, the code for receiving 1744 or the code for communicating 1738 of FIG. 17 is executed to perform the operations of block 2406.

Fourteenth Example Process

Figure 25:
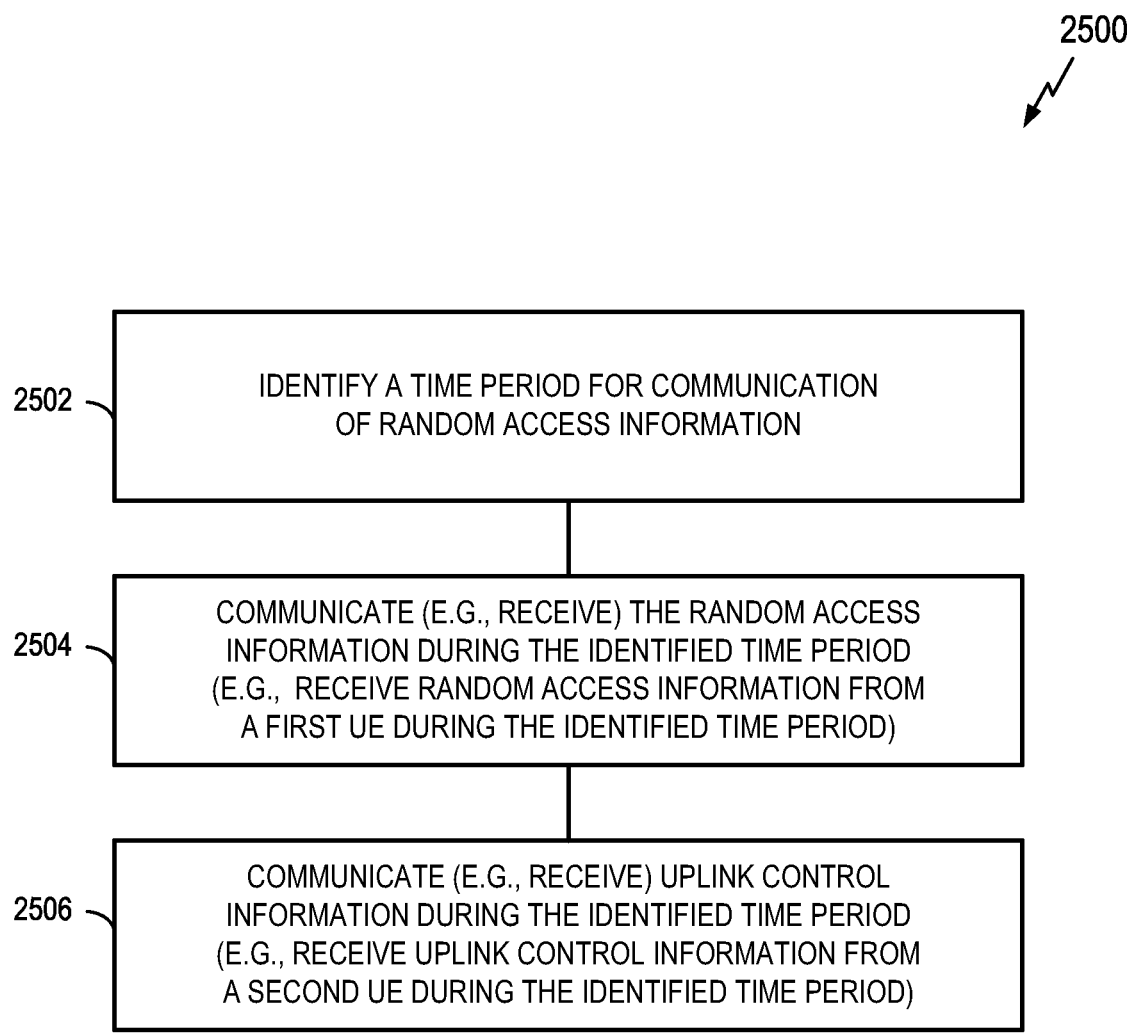
FIG. 25 is a flowchart illustrating an example of another process for communicating uplink control information in accordance with some aspects of the disclosure.

FIG. 25 illustrates a process 2500 for communication in accordance with some aspects of the disclosure. In some aspects, the process 2500 may be performed in conjunction with (e.g., as part of or in addition to) the process 1800 of FIG. 18. The process 2500 may take place within a processing circuit (e.g., the processing circuit 1710 of FIG. 17), which may be located in a base station, a UE, or some other suitable apparatus. Of course, in various aspects within the scope of the disclosure, the process 2500 may be implemented by any suitable apparatus capable of supporting communication-related operations.

At block 2502, an apparatus (e.g., a base station) identifies a time period for communication of random access information. For example, the apparatus may select symbol locations within a frame.

In some implementations, the circuit/module for communicating 1720 of FIG. 17 performs the operations of block 2502. In some implementations, the code for communicating 1738 of FIG. 17 is executed to perform the operations of block 2502.

At block 2504, the apparatus communicates (e.g., receives) the random access information during the identified time period. For example, a base station may receive the random access information from a first UE (or a first set of UEs). In some aspects, the random access information may be communicated via an inner portion of bandwidth allocated for communication of a frame. In some aspects, the random access information may be random access channel (RACH) information. In some aspects, the communication of the random access information may include communicating the random access information in a directional manner.

In some implementations, the circuit/module for receiving 1726 or the circuit/module for communicating 1720 of FIG. 17 performs the operations of block 2504. In some implementations, the code for receiving 1744 or the code for communicating 1738 of FIG. 17 is executed to perform the operations of block 2504.

At block 2506, the apparatus communicates (e.g., receives) uplink control information during the identified time period. For example, a base station may receive the uplink control information from a second UE (or a second set of UEs). In some aspects, the random access information and the uplink control information may be communicated as frequency division multiplexed orthogonal tones. In some aspects, the uplink control information and the random access information may be communicated concurrently with each other and exclusive of any other information within a frame. In some aspects, the uplink control information may be communicated via an outer portion of the bandwidth allocated for communication of a frame.

In some implementations, the circuit/module for receiving 1726 or the circuit/module for communicating 1720 of FIG. 17 performs the operations of block 2506. In some implementations, the code for receiving 1744 or the code for communicating 1738 of FIG. 17 is executed to perform the operations of block 2506.

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and *b*, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

The invention claimed is:

1. A method of communication, comprising:
communicating synchronization signals;
determining a specific time for communication of uplink control information, wherein the determination of the specific time comprises identifying at least one symbol associated with a strongest received signal strength for the synchronization signals, the specific time is determined based on the identified at least one symbol; and
communicating the uplink control information at the specific time.

2. The method of claim 1, wherein the determination of the specific time comprises determining at least one of: a symbol index, a sub-frame index, a radio frame index, or any combination thereof.

3. The method of claim 1, wherein the specific time corresponds to specific symbol locations.

4. The method of claim 1, wherein the synchronization signals comprise primary synchronization signals.

5. The method of claim 1, wherein the synchronization signals comprise secondary synchronization signals.

6. The method of claim 1, wherein the synchronization signals comprise beam reference signals.

7. The method of claim 1, wherein the determination of the specific time comprises:
identifying a particular synchronization signal of the synchronization signals; and
identifying a timeslot of the particular synchronization signal,
wherein the specific time is determined based on the identified timeslot.

8. The method of claim 7, wherein the identification of the particular synchronization signal comprises:
determining received signal strengths of the synchronization signals;
identifying the strongest received signal strength as a strongest one of the received signal strengths; and
identifying the particular synchronization signal associated with the strongest received signal strength.

9. The method of claim 1, further comprising:
communicating random access information via a frame.

10. The method of claim 9, wherein the uplink control information and the random access information are communicated concurrently with each other and exclusive of any other information within the frame.

11. The method of claim 10, wherein:
the random access information is communicated via one portion of bandwidth allocated for communication of the frame; and
the uplink control information is communicated via a different portion of the bandwidth allocated for communication of the frame.

12. The method of claim 9, wherein the random access information comprises random access channel (RACH) information.

13. The method of claim 9, wherein the communication of the random access information comprises communicating the random access information in a directional manner.

14. The method of claim 1, further comprising:
determining tone locations for the communication of the uplink control information within a frame, wherein:
the determination of the tone locations is based on the synchronization signals, and
the uplink control information is communicated at the tone locations within the frame.

15. The method of claim 1, further comprising:
receiving an indication of tone locations to be used for the communication of the uplink control information; and
using the tone locations to communicate the uplink control information.

16. The method of claim 1, wherein the communication of the uplink control information comprises sending the uplink control information by a user equipment.

17. The method of claim 16, further comprising:
receiving an indication of a cyclic shift to be used for the sending of the uplink control information; and
applying the cyclic shift during the sending of the uplink control information.

18. The method of claim 1, further comprising:
sending signals by a base station to assist a plurality of user equipments (UEs) to transmit the uplink control information,
wherein the communication of the uplink control information comprises receiving, by the base station, the uplink control information from the UEs.

19. The method of claim 1, wherein the communication of the uplink control information comprises receiving the uplink control information by a base station.

20. The method of claim 19, wherein:
the communication of the synchronization signals comprises sending the synchronization signals by the base station via a plurality of beam directions; and
the communication of the uplink control information further comprises receiving the uplink control information via a symbol location mapped to at least one of the plurality of beam directions.

21. The method of claim 19, further comprising:
selecting a cyclic shift to be used for transmission of the uplink control information by a user equipment; and
sending an indication of the selected cyclic shift by the base station.

22. The method of claim 1, wherein the uplink control information comprises physical uplink control channel (PUCCH) information.

23. The method of claim 1, wherein the uplink control information comprises scheduling request information.

24. An apparatus for communication comprising:
a memory device; and
a processing circuit coupled to the memory device and configured to:
communicate synchronization signals;
determine a specific time for communication of uplink control information, wherein the determination of the specific time comprises identifying at least one symbol associated with a strongest received signal strength for the synchronization signals, the specific time is determined based on the identified at least one symbol; and
communicate the uplink control information at the specific time.

25. The apparatus of claim 24, wherein:
the processing circuit is further configured to communicate random access information via a frame; and
the random access information and the uplink control information are communicated as frequency division multiplexed orthogonal tones.

26. The apparatus of claim 24, wherein:
the processing circuit is further configured to determine tone locations for the communication of the uplink control information within a frame;

the determination of the tone locations is based on the synchronization signals; and
the uplink control information is communicated at the tone locations within the frame.

27. The apparatus of claim 24, wherein:
the communication of the uplink control information comprises transmission of the uplink control information by a user equipment; and
the communication of the synchronization signals comprises receipt of the synchronization signals.

28. The apparatus of claim 27, wherein the processing circuit is further configured to:
receive an indication of symbol locations within a frame; and
send the uplink control information at the indicated symbol locations.

29. The apparatus of claim 27, wherein the processing circuit is further configured to:
receive an indication of tone locations within a frame; and
send the uplink control information at the indicated tone locations.

30. The apparatus of claim 27, wherein the processing circuit is further configured to:
determine tone locations based on an identifier of the user equipment; and
send the uplink control information at the determined tone locations.

31. The apparatus of claim 24, wherein:
the communication of the uplink control information comprises receipt of the uplink control information by a base station; and
the communication of the synchronization signals comprises transmission of the synchronization signals.

32. The apparatus of claim 31, wherein the processing circuit is further configured to:
select symbol locations within a frame for uplink communication; and
send an indication of the selected symbol locations by the base station.

33. The apparatus of claim 31, wherein the processing circuit is further configured to:
select tone locations within a frame for uplink communication; and
send an indication of the selected tone locations by the base station.

34. The apparatus of claim 31, wherein the processing circuit is further configured to:
select tone locations within a frame for uplink communication by a user equipment;
determine an identifier of the user equipment based on the selected tone locations; and
send the identifier by the base station.

35. The apparatus of claim 24, wherein the uplink control information comprises at least one of: channel quality information, precoding matrix information, a scheduling request, acknowledgement information, or any combination thereof.

36. An apparatus for communication comprising:
means for communicating synchronization signals;
means for determining a specific time for communication of uplink control information, wherein the determination of the specific time comprises identifying at least one symbol associated with a strongest received signal strength for the synchronization signals, the specific time is determined based on the identified at least one symbol; and
means for communicating the uplink control information at the specific time.

37. The apparatus of claim 36, further comprising:
means for determining tone locations for the communication of the uplink control information within a frame, wherein:
the determination of the tone locations is based on the synchronization signals, and
the uplink control information is communicated at the tone locations within the frame.

38. The apparatus of claim 36, wherein the communication of the uplink control information comprises transmission of the uplink control information by a user equipment.

39. The apparatus of claim 38, further comprising:
means for determining tone locations based on an identifier of the user equipment,
wherein the uplink control information is sent at the determined tone locations.

40. The apparatus of claim 38, further comprising:
means for receiving an indication of a cyclic shift to be used for the transmission of the uplink control information; and
means for applying the cyclic shift during the transmission of the uplink control information.

41. The apparatus of claim 36, wherein the communication of the uplink control information comprises receipt of the uplink control information by a base station.

42. The apparatus of claim 41, further comprising:
means for selecting symbol locations within a frame for uplink communication; and
means for sending an indication of the selected symbol locations by the base station.

43. The apparatus of claim 41, further comprising:
means for selecting tone locations within a frame for uplink communication; and
means for sending an indication of the selected tone locations by the base station.

44. The apparatus of claim 41, further comprising:
means for selecting tone locations within a frame for uplink communication by a user equipment;
means for determining an identifier of the user equipment based on the selected tone locations; and
means for sending the identifier by the base station.

45. The apparatus of claim 41, further comprising:
means for selecting a cyclic shift to be used for transmission of the uplink control information by a user equipment; and
means for sending an indication of the selected cyclic shift by the base station.

46. A non-transitory computer-readable medium storing computer-executable code, including code to:
communicate synchronization signals;
determine a specific time for communication of uplink control information, wherein the determination of the specific time comprises identifying at least one symbol associated with a strongest received signal strength for the synchronization signals, the specific time is determined based on the identified at least one symbol; and
communicate the uplink control information at the specific time.

47. The computer-readable medium of claim 46, wherein the uplink control information comprises channel quality information.

48. The computer-readable medium of claim 46, wherein the uplink control information comprises precoding matrix information.

49. The computer-readable medium of claim 46, wherein the uplink control information comprises a scheduling request.

50. The computer-readable medium of claim 46, wherein the uplink control information comprises acknowledgement information.

\* \* \* \* \*